United States Patent
Park et al.

(10) Patent No.: US 11,753,150 B2
(45) Date of Patent: Sep. 12, 2023

(54) UNMANNED AERIAL VEHICLE AND METHOD FOR OPERATING SAME

(71) Applicant: Samsung Electronics Co., Ltd, Suwon-si (KR)

(72) Inventors: Sang-Il Park, Seoul (KR); Eunyoung Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1189 days.

(21) Appl. No.: 16/340,291

(22) PCT Filed: Aug. 31, 2017

(86) PCT No.: PCT/KR2017/009520
§ 371 (c)(1),
(2) Date: Apr. 8, 2019

(87) PCT Pub. No.: WO2018/066819
PCT Pub. Date: Apr. 12, 2018

(65) Prior Publication Data
US 2019/0315460 A1 Oct. 17, 2019

(30) Foreign Application Priority Data

Oct. 6, 2016 (KR) .................. 10-2016-0128966

(51) Int. Cl.
*B64C 25/18* (2006.01)
*B64C 25/32* (2006.01)
(Continued)

(52) U.S. Cl.
CPC .............. *B64C 25/18* (2013.01); *B64C 25/32* (2013.01); *B64C 39/024* (2013.01); *B64U 30/20* (2023.01)

(58) Field of Classification Search
CPC ......... B64C 25/18; B64C 25/20; B64C 25/26; B64C 25/32; B64C 39/024; B64C 2201/108
See application file for complete search history.

(56) References Cited

U.S. PATENT DOCUMENTS 2,427,885 A * 9/1947 Turansky ............... B64C 25/26
244/102 R
3,036,794 A * 5/1962 Mallinckrodt .......... B64C 29/02
244/100 R
(Continued)

FOREIGN PATENT DOCUMENTS

JP 2016-107984 A 6/2016
KR 10-2001-0103221 A 11/2001
(Continued)

OTHER PUBLICATIONS

Attached English translation of KR 101461059 (Year: 2014).*
(Continued)

*Primary Examiner* — Peter M Poon
*Assistant Examiner* — Marisa V Conlon

(57) ABSTRACT

An Unmanned Aerial Vehicle (UAV) according to various embodiments may include: a housing; a motor arranged in an inner space of the housing; a rotor which is rotated by the motor and includes at least one cam structure; and at least one landing member which serves as at least part of the housing and selectively protrudes from the housing depending on interference of the cam structure. An UAV according to various embodiments may include: a housing; at least one rotor blade arranged in an inner space of the housing; and at least one landing member. The at least one landing member may serve as part of the housing in a closed position and protrudes from the housing in an open position such that a (Continued)

load of the UAV can be supported during landing. Other embodiments are also possible.

14 Claims, 17 Drawing Sheets

(51) Int. Cl.
*B64C 39/02* (2023.01)
*B64U 30/20* (2023.01)

(56) References Cited

U.S. PATENT DOCUMENTS

| | | | | |
|---|---|---|---|---|
| 3,591,109 | A * | 7/1971 | McLarty | B64C 27/14 244/17.23 |
| 5,575,438 | A | 11/1996 | McGonigle et al. | |
| 6,168,113 | B1 * | 1/2001 | Hann | B64C 25/26 292/249 |
| 7,559,506 | B2 * | 7/2009 | Kissel, Jr. | B64C 39/001 244/17.11 |
| 8,418,959 | B2 | 4/2013 | Kang et al. | |
| 9,004,401 | B2 * | 4/2015 | Evans | B64C 25/26 244/102 SL |
| 9,731,816 | B2 | 8/2017 | Harris, III et al. | |
| 10,364,022 | B2 * | 7/2019 | Bond | B64C 25/30 |
| 10,569,868 | B2 * | 2/2020 | von Flotow | B64C 25/08 |
| 10,875,641 | B2 * | 12/2020 | Kovac | B64D 45/04 |
| 10,946,958 | B2 * | 3/2021 | Baek | B64C 27/20 |
| 2007/0034738 | A1 * | 2/2007 | Sanders | B64C 27/12 244/23 A |
| 2011/0068224 | A1 | 3/2011 | Kang et al. | |
| 2012/0083945 | A1 * | 4/2012 | Oakley | G05D 1/0858 701/2 |

FOREIGN PATENT DOCUMENTS

| | | |
|---|---|---|
| KR | 10-2011-0024616 A | 3/2011 |
| KR | 10-2012-0136797 A | 12/2012 |
| KR | 10-1461059 B1 | 11/2014 |
| KR | 10-2016-0051163 A | 5/2016 |

OTHER PUBLICATIONS

International Search Report dated Dec. 12, 2017 in connection with International Patent Application No. PCT/KR2017/009520, 2 pages.
Written Opinion of the International Searching Authority dated Dec. 12, 2017 in connection with International Patent Application No. PCT/KR2017/009520, 7 pages.
Notice of Preliminary Rejection dated Mar. 16, 2023, in connection with Korean Application No. 10-2016-0128966, 11 pages.
Allensblade, "Quadcopter Gone Flying Saucer," YouTube video, https://youtu.be/14qhp10X-jQ, Jun. 11, 2012, 1 page.
Newell, "P-51D 1:96 Retract Mechanism," YouTube video, https://youtu.be/09nmmv-PJ_U, Feb. 8, 2014, 1 page.

* cited by examiner

UNMANNED AERIAL VEHICLE AND METHOD FOR OPERATING SAME

CROSS-REFERENCE TO RELATED APPLICATIONS

This application is a 371 of International Application No. PCT/KR2017/009520 filed on Aug. 31, 2017, which claims priority to Korean Patent Application No. 10-2016-0128966 filed on Oct. 6, 2016, the disclosures of which are herein incorporated by reference in their entirety.

BACKGROUND

1. Field

Various embodiments of the disclosure relate to an unmanned aerial vehicle including a landing member, and an operating method thereof.

2. Description of Related Art

An Unmanned Aerial Vehicle (UAV) is an aerial vehicle that can fly automatically through remote control without a pilot on board. Unlike a typical aerial vehicle, the UAV does not require an additional space for the pilot on board, and thus can be made smaller in size and lighter in weight. Therefore, it is developed and utilized for military purposes such as a reconnaissance UAV for information collection and reconnaissance in a place where a user access is difficult. In addition, it has recently been equipped with an image capturing function and commercialized and popularized for leisure.

In general, the UAV is constructed of a plurality of modules such as a housing constituting a frame of the UAV, the frame coupled to the housing to support a motor, the motor directly coupled to the frame to move a rotor blade, and the rotor blade which moves by means of the motor. The UAV may be referred to as a drone, and according to the number of rotor blades, may also be referred to as a quad-rotor, a hexa-rotor, and an octo-rotor when the number of rotor blades is 4, 6, and 8, respectively.

However, some modules such as an external rotor blade, motor, or the like of the UAV may be damaged during flight or due to collision with another UAV and an external obstacle, and some components of the UAV may be damaged by an impact acquired while falling to the ground in case of emergency landing or crash of the UAV due to abnormal remote control.

In general, a UAV may include a landing member to prevent a housing, a rotor blade, or the like from being directly in contact with the ground upon landing. However, since the UAV has the landing member which is fixed to a body of the UAV, there is a problem in that an exterior is not aesthetically good or camera shooting is interrupted. In order to solve this problem, when the landing member is configured in a foldable structure, a separate component for this may be required.

Various embodiments of the disclosure may provide a UAV including a landing member which does not interrupt camera shooting or which does not aesthetically impair an exterior, and a driving method thereof.

SUMMARY

According to an embodiment of the disclosure, an Unmanned Aerial Vehicle (UAV) may include a housing, a motor arranged in an inner space of the housing, a rotor which is rotated by the motor and includes at least one cam structure, and at least one landing member which serves as at least part of the housing and selectively protrudes from the housing depending on interference of the cam structure.

According to an embodiment of the disclosure, an UAV may include a housing, at least one rotor blade arranged in an inner space of the housing, and at least one landing member. The at least one landing member may serve as part of the housing in a closed position and protrudes from the housing in an open position such that a load of the UAV can be supported during landing.

As described above, an Unmanned aerial Vehicle (UAV) according to various embodiments of the disclosure may include a housing including a rotor blade or the like in an inner space, and a landing member which serves as part of the housing. In the UAV according to various embodiments, the landing member operates by protruding to the outside of the housing upon landing of the UAV. Therefore, the UAV can be provided without aesthetically impairing an exterior without interrupting camera shooting.

DETAILED DESCRIPTION

Figure 1:
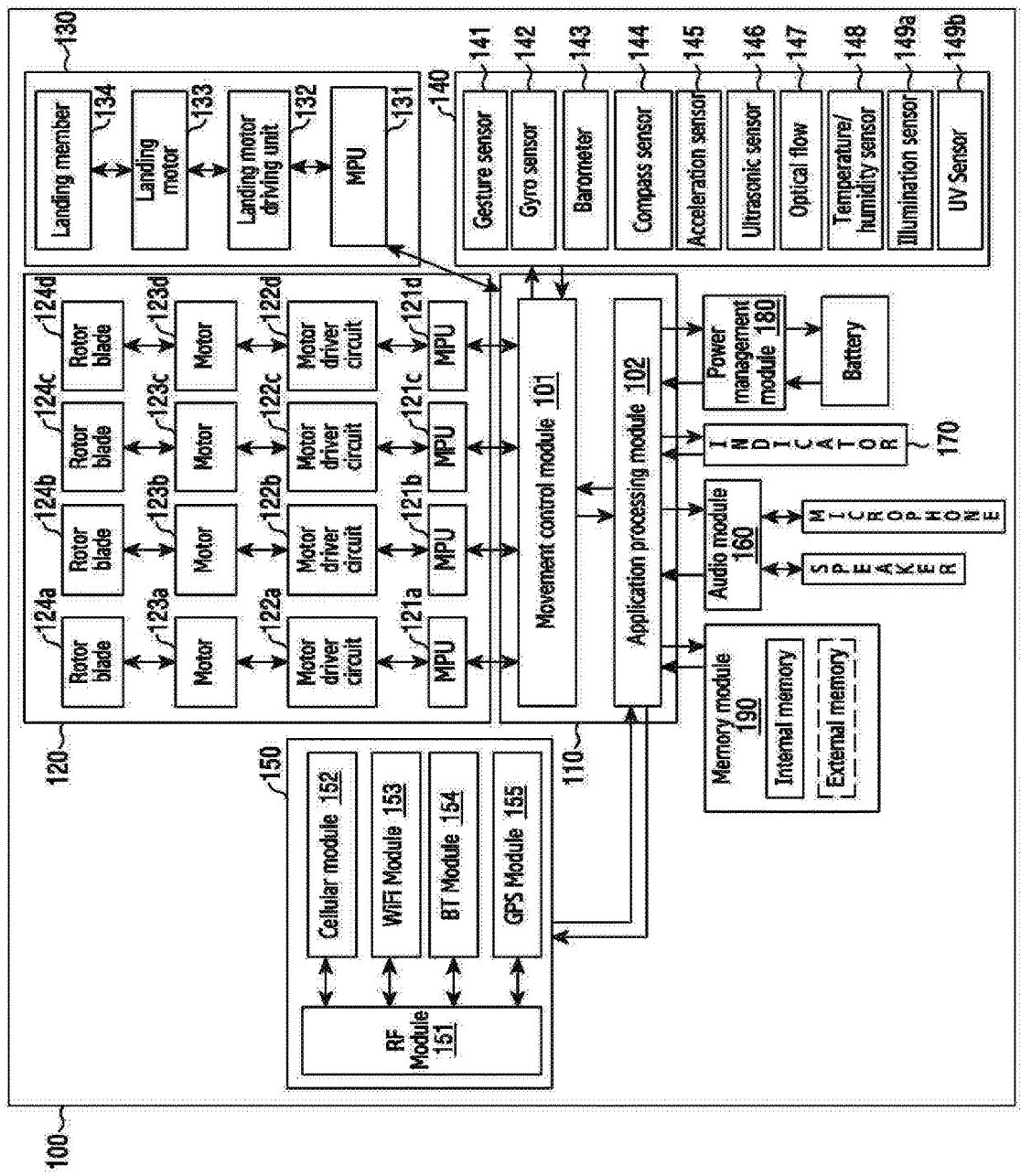
FIG. 1 illustrates an exemplary configuration of an Unmanned Aerial vehicle (UAV) according to various embodiments of the disclosure.

Hereinafter, various embodiments of the document are described with reference to the accompanying drawings. It should be appreciated that embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular expression may include a plural expression unless there is a contextually distinctive difference. As used herein, each of such phrases as "A or B," "at least one of A and/or B," or the like may include all possible combinations of the items enumerated together. Expressions such as "$1^{st}$" and "$2^{nd}$" or "first" and "second" may be used to simply distinguish a corresponding component from another, and does not limit the component in other aspect (e.g., importance or order). When a certain (e.g., $1^{st}$) component is mentioned as being "operatively or communicatively coupled with/to" or "connected to" a different (e.g., $2^{nd}$) component, the certain component is directly coupled with/to another component or can be coupled with/to the different component via another (e.g., $3^{rd}$) component.

An expression "configured to" used in the document may be interchangeably used with, for example, "suitable for", "having the capacity to", "adapted to", "made to", "capable of", or "designed to" in a hardware or software manner according to a situation. In some situations, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure may include at least one of smartphones, tablet personal computers (Ks), mobile phones, video telephones, electronic book readers, desktop PCs, laptop PCs, netbook computers, workstations, servers, personal digital assistants (RDAs), portable multimedia players (PMPs), Motion Picture Experts Group (MPEG-1 or MPEG-2) Audio Layer 3 (MP3) players, mobile medical devices, cameras, or wearable devices (for example, smart glasses, head-mounted-devices (HMDs), electronic apparels, electronic bracelets, electronic necklaces, electronic appcessory, electronic tattoos, smart mirrors, or smart watches). According to certain embodiments, the electronic devices may be smart home appliances. The smart home appliances may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™, or Google TV™), game consoles (for example, Xbox™ and PlayStation™), electronic dictionaries, electronic keys, camcorders, electronic picture frames, and the like.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation electronic devices, global positioning system receivers (GPSs), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or internet of things (for example, light bulbs, various sensors, electric or gas meters, sprinkler devices, fire alarms, thermostats, street lamps, toasters, exercise equipment, hot water tanks, heaters, boilers, and the like). According to a certain embodiment, the electronic devices may include at least one of a part of furniture or buildings/structures, electronic boards, electronic signature receiving devices, projectors, or various measuring instruments (for example, water meters, electricity meters, gas meters, or wave meters, and the like). The electronic devices according to various embodiments may be one or more combinations of the above-mentioned devices. According to a certain embodiment, an electronic device may be a flexible electronic device. Also, electronic devices according to various embodiments of the present disclosure are not limited to the above-mentioned devices, and may include new electronic devices according to technology development.

In the following embodiment, an 'unmanned aerial vehicle' refers to an aerial vehicle that can be remotely controlled without a person on board to control the aerial vehicle, and specifically, for example, includes a tri-rotor having three propellers, a quad-rotor having four propellers, a penta-rotor having five propellers, a hex-rotor having six propellers, an octo-rotor having eight propellers, and the like. Although the quad-rotor is described for example in the following description, the scope of the disclosure is not limited thereto, and thus the number of rotor blades and configurations thereof may be various.

FIG. 1 illustrates an exemplary configuration of an Unmanned Aerial vehicle (UAV) according to various embodiments of the disclosure. An example in which the UAV is a quad-rotor is illustrated in FIG. 1.

Referring to FIG. 1, a processor 110 of a UAV 100 may include at least a movement control module 111 and an application processing module 112. The processor 110 may perform computations or data processing, for example, for control and/or communication of at least one different components of the UAV 100.

The movement control module 111 may control a movement of the UAV 100 by using position and posture information of the UAV 100 or an operating signal of a controller. In addition, the movement control module 111 may include a flight control module and a posture control module. The flight control module may control a roll, pitch, yaw, throttle, or the like of the UAV 100 on the basis of the position and posture information acquired in the posture control module and the operating signal of the controller. The movement control module 111 may control a hovering operation, and may allow the UAV 100 to fly to up to a target point on the basis of position information provided by the application processing module 112 and the operating signal of the controller.

The application processing module 112 may receive state information of the UAV 100 and provide it to the controller. Alternatively, the state information of the UAV 100 may be informed to a user under the control of an audio module 160 or a display unit or the like. In addition, when a camera device is mounted, an automatic image capturing mode may be controlled based on received image capturing information. The image capturing information may include image capturing position information. The image capturing information may include composition information and/or camera control information in addition to the image capturing position information. The image capturing information may be image capturing information based on user preference in the electronic device. The application processing module 112 may transfer the image capturing position information to the movement control module 111 to control a movement of the UAV 100. The application processing module 112 may transfer driving and/or camera control information to the camera device to control an image capturing composition and angle of a camera and a subject.

When the UAV 100 is a quad-rotor, a movement module 120 may include Micro Processor Units (MPUs) 121a to 121d, motor driver circuits 122a to 122d, motors 123a to 123d, and rotor blades 124a to 124d. The MPUs 121a to 121d may output control data for rotating the respective corresponding rotor blades 124a to 124d on the basis of an operating signal output from the movement control module 111. The motor driver circuits 122a to 122d may output motor control data output from the MPUs 121a to 121d by converting it to a driving signal. The motors 123a to 123d may control a rotation of the corresponding rotor blades 124a to 124d on the basis of a driving signal of the respective corresponding motor driver circuits 122a to 122d.

A landing module 130 may include an MPU 131, a landing motor driving unit 132, a landing motor 133, and a landing member 134. The MPU 131 may output control data for unfolding the landing member 134 on the basis of a manipulation of a controller or information regarding the distance between the UAV 100 and the ground and received from the movement control module 111. The landing motor driving unit 132 may output motor control data output from the MPU 131 by converting it to a driving signal. The landing motor 133 may unfold the landing member 134 on the basis of the driving signal of the landing motor driving unit 132.

A sensor module 140 may include some or all of a gesture sensor 141 capable of sensing a motion and/or gesture of a subject, a gyro sensor 142 capable of measuring angular velocity of the UAV 100 in flight, a barometer 143 capable of measuring a pressure change in the air and/or atmospheric pressure, a geomagnetic sensor (terrestrial magnetism sensor, compass sensor) 144 capable of measuring a magnetic field of the Earth, an acceleration sensor 145 for measuring acceleration of the UAV 100 in flight, an ultrasonic sensor 146 capable of outputting an ultrasonic wave to measure a distance by measuring a signal reflected from an object, an optical flow 147 capable of calculating a position by recognizing a ground terrain or pattern by the use of a camera module, a temperature-humidity sensor 148 capable of measuring temperature and humidity, an illumination sensor 149a capable of measuring illumination, and an Ultra Violet (UV) sensor 149b capable of measuring an ultra violet ray.

According to various embodiments of the disclosure, the sensor module 140 may measure a distance between the UAV 100 and the ground. A sensor for measuring the distance between the UAV 100 and the ground may be the ultrasonic sensor 146 or the optical flow 147. The ultrasonic sensor 146 may output an ultrasonic wave and measure the distance from the ground by outputting an ultrasonic wave reflected from the ground. The optical flow 147 may recognize a bottom terrain or pattern by using an image capturing device such as a camera or the like to measure the distance to the ground from the UAV 100.

According to various embodiments of the disclosure, a communication module 150 may include at least one of a wireless communication module and a wired communication module. The communication module 150 may include an RF module 151, a cellular module 152, a WiFi module 153, a Bluetooth module 154, and a GPS module 155.

According to various embodiments of the disclosure, the GPS module 155 may output position information such as longitude, latitude, altitude, GPS speed, GPS heading, or the like of the UAV 100 during the movement of the UAV 100. The position information may be calculated by measuring an accurate time and distance through the GPS module. The GPS module 155 may acquire not only the latitude, longitude, and altitude positions but also the accurate time together with three-dimensional velocity information.

The communication module 150 may perform communication for receiving a movement operating signal of another electronic device (e.g., a controller) and the UAV 100 or transmitting position information for acquiring a real-time movement state. According to various embodiments, the communication module 150 may transmit an image captured in the UAV 100 and capturing information to an external electronic device such as the controller or the like.

An audio module 160 may bilaterally convert, for example, sound and electric signals. The audio module 160 may process sound information which is input or output through, for example, a speaker, a receiver, an earphone, a microphone, or the like.

An indicator 170 may indicate a particular state of the UAV 100 or a portion thereof (e.g., the processor 110), such as a booting state, a message state, a charging state, or the like.

A power management module 180 may manage, for example, power of the UAV 100. According to various embodiments, the power management module 180 may include a Power Management Integrated Circuit (PMIC), a charging IC, or a battery gauge. The PMIC may have a wired charging type and/or a wireless charging type. The wireless charging type may include, for example, a magnetic resonance type, a magnetic induction type, and an electromagnetic type, and may further include an additional circuit for wireless charging, for example, a coil loop, a resonant circuit, a rectifier, or the like. The battery gauge may measure, for example, remaining capacity of the battery and a voltage, current, or temperature during charging. The battery may include, for example, a rechargeable battery and/or a solar battery.

A memory module 190 may include an internal memory and an external memory. A related command or data may be stored in at least one different component of the UAV 100. The memory module 190 may store a software and/or a program. The program may include a kernel, a middleware, an Application Programming Interface (API), and/or an application program (or an "application") or the like.

Figure 2A:
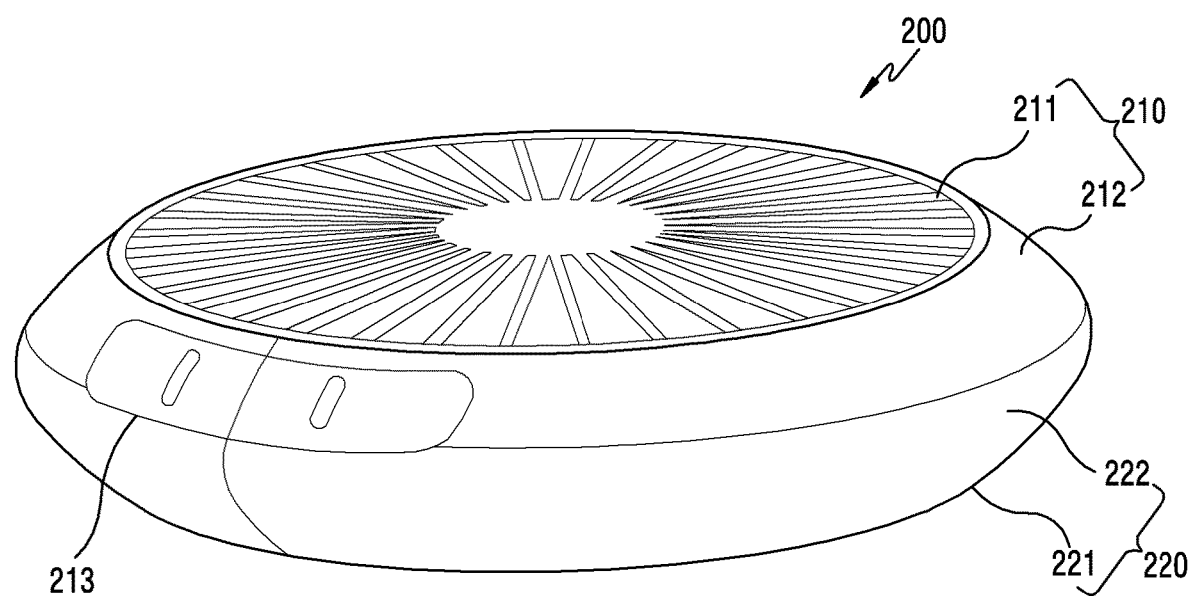
FIG. 2A is a perspective view illustrating an exterior of a UAV according to various embodiments of the disclosure.
Figure 2B:
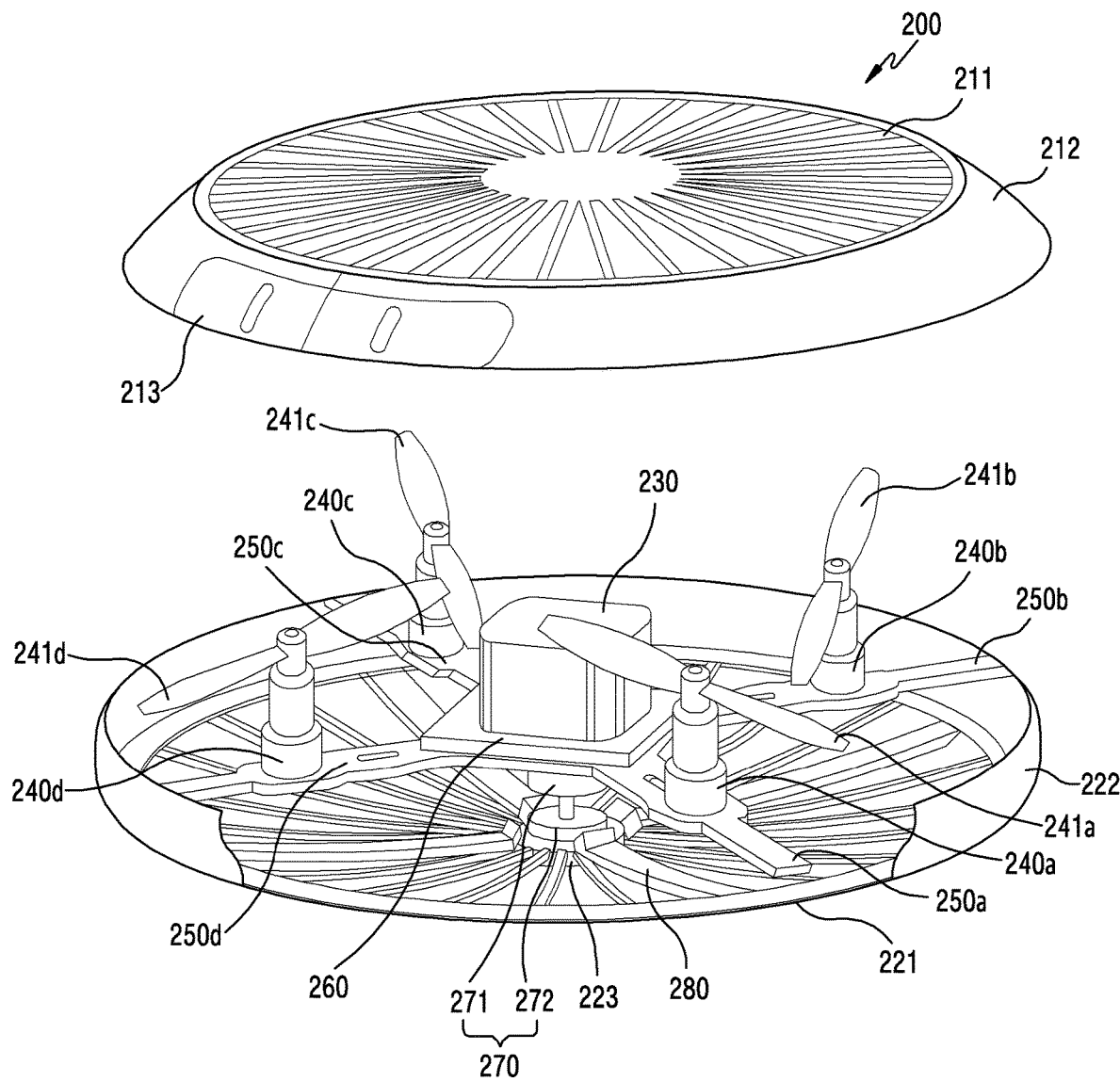
FIG. 2B is an exploded perspective view of a UAV according to various embodiments of the disclosure.

FIG. 2A is a perspective view illustrating an exterior of a UAV according to various embodiments of the disclosure, and FIG. 2B is an exploded perspective view of a UAV according to various embodiments of the disclosure.

Referring to FIG. 2A and FIG. 2B, a UAV 200 according to various embodiments may include housings 210 and 220. The housings 210 and 220 may be referred to as a case, a protective cover, or a body. The housings 210 and 220 may have a substantially disc shape. However, the embodiment is not limited thereto, and when viewed from above, the UAV may have various shapes such as a triangle, a square, a pentagon, or the like. However, the following descriptions focus on a case where the housing of the UAV has a disc shape.

According to various embodiments, the UAV 200 may include a central body 230, a plurality of propulsion units 240a to 240d, a plurality of extension portions 250a to 250d, a central bracket 260, a landing module 270, and a landing member 280, in an inner space constructed by the upper housing 210 and the lower housing 220. However, the exterior of the UAV 200 may be constructed only of the housings 210 and 220. In other words, only the housings 210 and 220 including internal components such as the plurality of propulsion units 240a to 240d respectively including a plurality of rotor blades 241a to 241d, the central body 230 for driving them, the central bracket 260, or the like in the inner space may be exposed to the outside. Therefore, the UAV 200 may omni-directionally protect the internal components from an external obstacle. In particular, the housings 210 and 220 of the UAV 200 may safely protect the plurality of rotor blades 241a to 241d which rotate at a high speed. Alternatively, it is possible to prevent external objects from being damaged by a rapid rotation of the plurality of rotor blades 241a to 241d.

The housing 210 may include a first upper housing 211, a second upper housing 212, a first lower housing 221, and a second lower housing 222. The first upper housing 211 and the second upper housing 212 may construct a convex disc shape, and the first lower housing 221 and the second lower housing 222 may construct a concave disc shape.

According to various embodiments, an upper face of the first upper housing 211 may be constructed in a structure including a plurality of vents for an air flow by an operation of the rotor blades 241a to 241d of the UAV 200. For example, the first upper housing 211 may be constructed of a plurality of radial unit members extended from a center portion of the first upper housing 211. That is, the first upper housing 211 may include a comb pattern structure arranged towards a circumference. In other words, the first upper housing 211 may be constructed of a plurality of radial unit members extended from the center portion of the first upper housing 211 and spaced apart by a specific central angle towards the circumference. A space between the plurality of radial unit members may be a path for the air flow which occurs by an operation of the rotor blade.

Likewise, a lower face of the first lower housing 221 may be constructed in a structure including a plurality of vents for an air flow by an operation of the rotor blade of the UAV. That is, the first lower housing 221 may include a comb pattern structure arranged towards the circumference.

However, the embodiment is not limited thereto, and the radial unit members of the upper housing 210 and lower housing 220 may be arranged with various intervals. Alternatively, the upper housing 210 and the lower housing 220 may include a vent for an air flow which occurs by the rotor blade and may be constructed in various shapes capable of protecting the rotor blade. For example, the upper housing 210 and the lower housing 220 may include a mesh-type structure. For another example, it is also possible to include a closed-type structure including an opening only in a portion in which the rotor blade is located. That is, the UAV 200 may include a housing of various shapes to protect internal components from an external obstacle.

The UAV 200 according to various embodiments may include various functional components 213 arranged in the exterior of the housing 210. For example, the functional component 213 may include a display, button, lamp, speaker, microphone, or the like arranged in at least part of the second upper housing 212.

The central body 230 may be arranged in the center of the UAV 200 and thus may be the center of balance of the UAV 200. The central body 230 may mount various hardware components (e.g., a communication component, a control component, or a battery) equipped in the UAV 200. In addition, the central body 230 may be mounted on the central bracket 260.

The plurality of extension portions 250a to 250d may be arranged to have a specific center angle with respect to the center of the central body 230 on an outer circumference of the central body 230. The plurality of extension portions 250a to 250d may be arranged by being coupled to the central bracket 260, or may be constructed by being extended from the central bracket 260. According to various embodiments, the plurality of extension portions 250a to 250d may be constructed by being extended towards a circumference from the central body 230. That is, the plurality of extension portions 250a to 250d and the central body 230 may be integrally constructed. Alternatively, the plurality of extension portions 250a to 250d, the central body 230, and the central bracket 260 may be integrally constructed.

Respective ends of the plurality of extension portions 250a to 250d may be coupled to the plurality of propulsion units 240a to 240d. That is, the number of the plurality of extension portions 250a to 250d may be equal to the number of the plurality of propulsion units 240a to 240d. For example, as illustrated, a quad-rotor UAV may include four extension portions and four propulsion units respectively corresponding to the extension portions. In this case, the fourth extension portions may be coupled to the central body 230 in an 'X' shape. In other words, the respective extension portions may be arranged symmetrically with the central body 230 being in the center. For another example, a hexa-rotor UAV may include six extension portions and six propulsion units respectively corresponding to the extension portions. In this case, the six extension portions may be arranged symmetrically with the central body 230 being in the center. However, the embodiment is not limited thereto, and the number of extension portions and the number of propulsion units may not be matched to each other. According to various embodiments, the number of extension portions and propulsion units and arrangement states thereof may be adjusted to improve reliability during flight.

The plurality of propulsion units 240a to 240d may respectively include the plurality of rotor blades 241a to 241d and motors for rotating the rotor blades. The UAV 200 may fly by using a thrust produced by a rotation of the plurality of rotor blades 241a to 241d. That is, the plurality of propulsion units 240a to 240d may provide the thrust so that the UAV 200 can fly.

The landing module 270 may include a landing motor 271 and a rotor 272. The landing motor 271 may be disposed to a rear face of the central bracket 260, and the rotor 272 may be disposed on a center portion 223 of the first lower housing 221. The landing motor 271 may rotate the rotor 272.

The landing member 280 may include a body including a specific length. The landing member 280 may be disposed at the center portion 223 of the lower housing 220 in a rotatable manner in a downward direction of the UAV 200. The landing member 280 may rotate in the downward direction of the UAV 200 by using the rotor 272 which is rotated by the landing motor 271. That is, the landing member 280 may protrude more to the outside than the housing 210. Therefore, the landing member 280 can prevent the exterior of the UAV 200 from directly being in contact with the ground upon landing of the UAV 200. In other words, the landing member 280 can protect a damage of the exterior of the UAV 200. Specific operations of the landing module 270 and landing members 280 will be described below in greater detail.

Figure 3A:
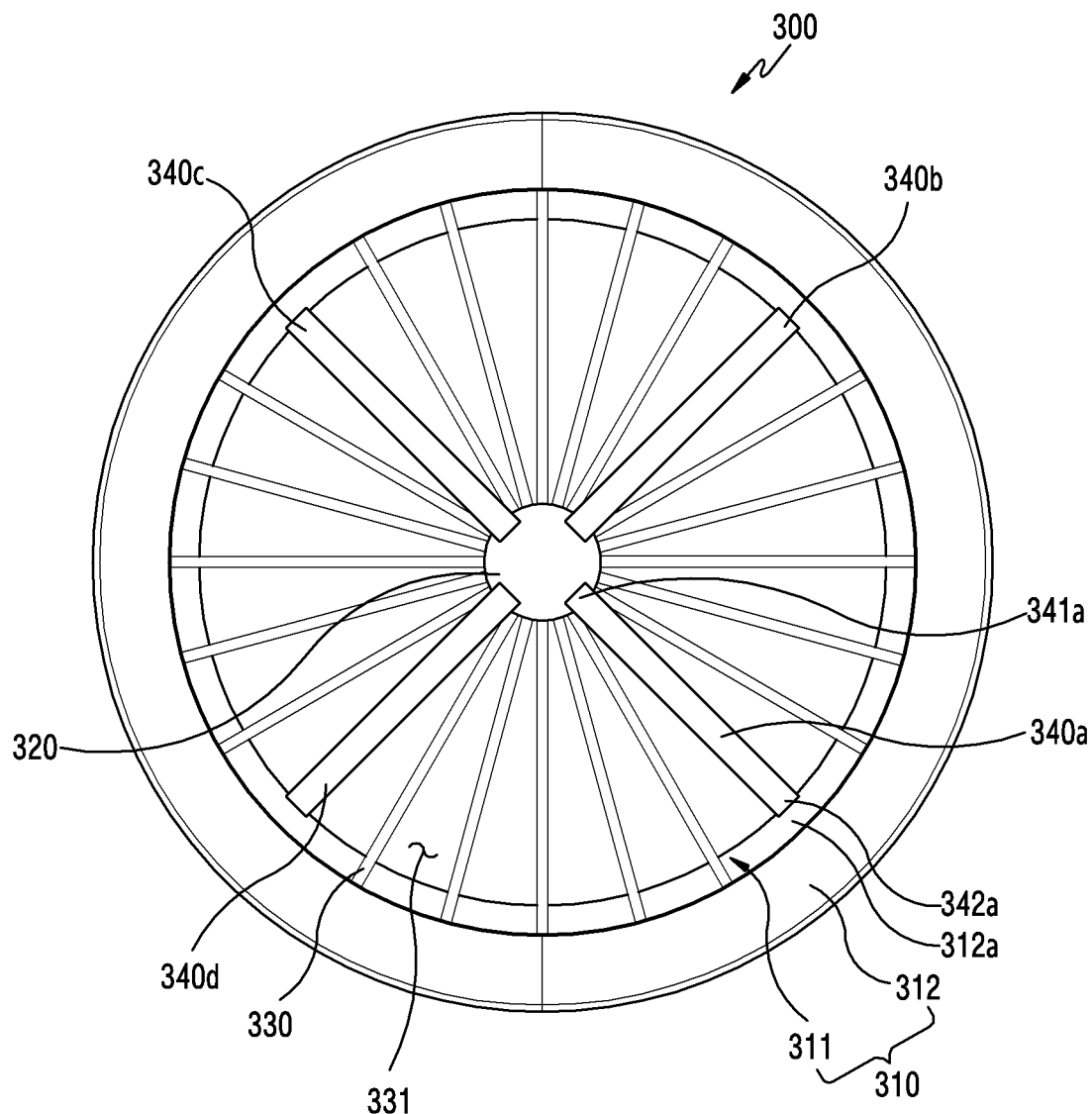
FIG. 3A is a cross-sectional view illustrating a rear face including a landing member of a UAV according to various embodiments of the disclosure.

FIG. 3A is a cross-sectional view illustrating a rear face including a landing member of a UAV according to various embodiments of the disclosure.

Figure 3B:
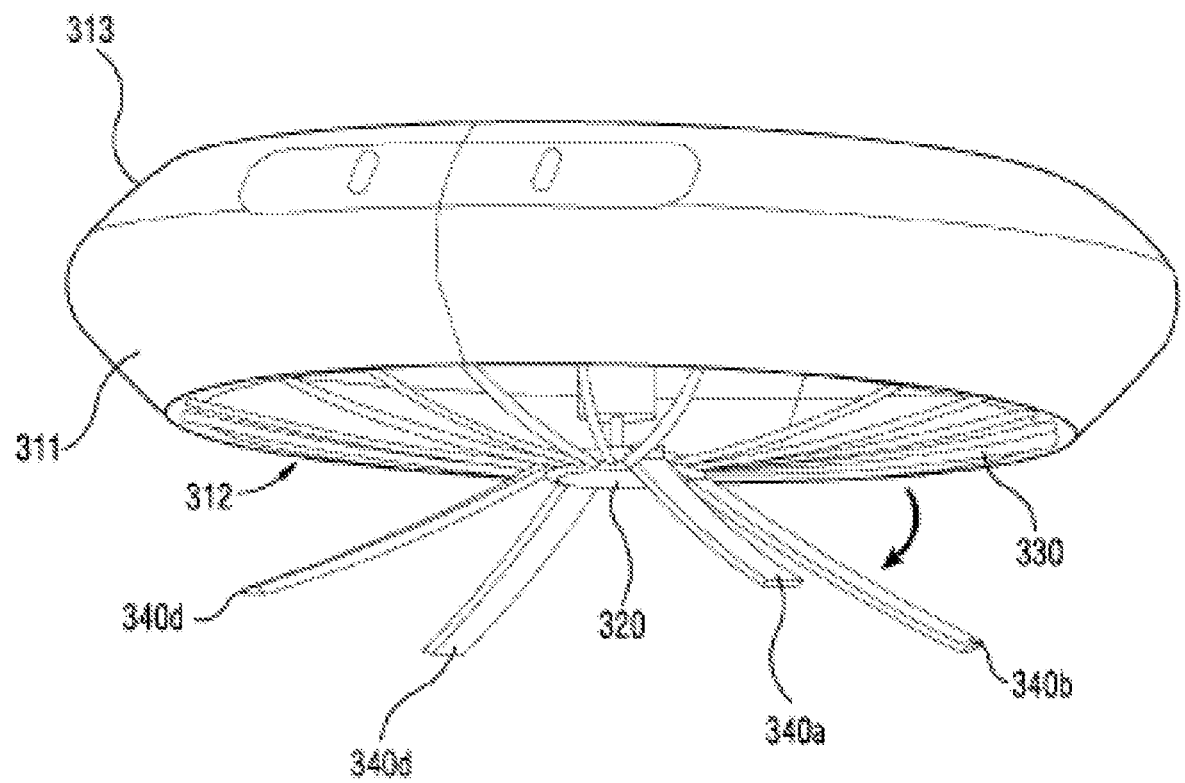
FIG. 3B is a perspective view illustrating an unfolded state of a landing member of a UAV is unfolded according to various embodiments of the disclosure.

FIG. 3B is a perspective view illustrating an unfolded state of a landing member of a UAV is unfolded according to various embodiments of the disclosure.

Referring to FIG. 3A, a lower housing 310 of a UAV 300 according to various embodiments may be constructed in a concave disc shape. The lower housing 310 according to various embodiments may include a first lower housing 311 and a second lower housing 312. The second lower housing 312 may include a disc-shaped rim portion, i.e., a ring shape. The second lower housing 312 may protect internal components from an external obstacle of an outer circumferential surface.

According to various embodiments, the first lower housing 311 may include a plurality of comb pattern unit members 330 which have a center portion 320 and are radiated from the center portion 320. The plurality of comb pattern unit members 330 may be constructed by being extended towards a circumference from the center portion 320 of the first lower housing 311, and may be arranged by being spaced apart from each other with a specific center angle. In other words, the plurality of comb pattern unit members 330 may be spaced apart from each other by a specific interval and may be disposed by being radiated from the center portion 320. Therefore, a space 331 between the plurality of comb pattern unit members 330 may be a vent having a specific area through which an air flow occurring by a rotor blade of a propulsion unit can pass. Likewise, the upper housing may also include the vent having the specific area through which the air flow occurring by the rotor blade of the propulsion unit can pass. Therefore, the housing of the UAV 300 may provide the vent through which the air flow occurring by the rotor blade passes, while protecting components of the UAV, such as the rotor blade, the propulsion unit, or the like, from an external obstacle.

According to various embodiments, the UAV 300 may include landing members 340a to 340d. Each landing member may be constructed in a bar shape having a specific length. According to various embodiments, the UAV 300 may use some of the plurality of comb pattern unit members 330 of the lower housing 310 as the landing members 340a to 340d. Alternatively, the landing member may include a shape similarly to that of the plurality of comb pattern unit members 330.

The landing member may include the first landing member 340a, the second landing member 340b, the third landing member 340c, and the fourth landing member 340d. Each of the landing members 340a to 340d may be arranged to be spaced apart by a specific included angle with respect to the center portion 320 of the lower housing 310. In addition, each of the landing members 340a to 340d may be disposed to the center portion 320 in an 'X' shape. In other words, each of the landing members 340a to 340d may be disposed to have an included angle of 90 degrees with the center portion 320 being in the center. Alternatively, each of the landing members 340a to 340d may be disposed symmetrically with the center portion 320 being in the center. However, the embodiment is not limited thereto, and the number of landing members may be at least 3 or 5. The landing member may be disposed in a circumferential direction to be equiangular from the center portion of the housing. For example, if the number of landing members is 3, each landing member may be disposed to have an angle of 120 degrees with the center portion being in the center. Alternatively, the number, shape, and arrangement state of the landing members may be variously adjusted to reliably support a load of the UAV.

According to various embodiments, each of the landing members 340a to 340d may be disposed to the center portion 320 in a rotatable manner. For example, a first end 341a of the first landing member 340a may be disposed to the center portion 320 in a hinge structure. Therefore, the first landing member 340a may rotate about the first end 341a in a downward direction of the UAV 300. Referring to FIG. 3A, a second end 342a opposite to the first end 341a of the first landing member 340a may be in contact with a circumferential portion of the first lower housing 311 instead of being coupled thereto. That is, the landing member may be integral with an outer face of the housing. Alternatively, the landing member may serve as part of the housing. In other words, a state where one end of each of the landing members 340a to 340d does not rotate in a downward direction and the other end of each of the landing members 340a to 340d is in contact with a circumferential portion 311a of the first lower housing 311 may be defined as a closed state. The closed state may be referred to as a folded state or an airborne state.

However, referring to FIG. 3B, the first landing member 340a according to various embodiments may rotate about the first end 341a by a specific angle in a downward direction of the UAV 300. That is, the second end 342a of the first landing member 340a may be spaced apart by a specific interval in a downward direction, instead of being in contact with the first end housing 311. Therefore, one end of each of the landing members 340a to 340d may rotate by a specific angle in a downward direction and thus may protrude to the outside of the housing. In other words, a state where the other end of each of the landing members 340a to 340d is spaced apart by a specific interval in the downward direction of the UAV 300 may be defined as an open state. The open state may be referred to as an unfolded state or a landing state.

Upon landing of the UAV 300, it may be spaced by a specific interval from the ground due to each of the landing members 340a to 340d which are unfolded by a specific angle in the open state. Alternatively, the landing members 340a to 340d of the open state may support the load of the UAV 300 from the ground upon landing of the UAV 300. That is, upon landing of the UAV 300, the housing and the exterior of the UAV can be prevented from being damaged by an external obstacle due to the landing member of the open state.

Referring to FIG. 3A and FIG. 3B, in the closed state, the landing member of the UAV 300 according to various embodiments may be integral with the housing of the UAV. For example, in the closed state, the first end 341a of the first landing member 340a may be coupled to the center portion 320 of the lower housing 310, and the second end 342a of the first landing member 340a may be in contact with the circumferential portion 311a of the first lower housing 311. In addition, in the open state, the landing member may protrude to the outside of the housing. For example, in the open state, the first landing member 340a may protrude in the downward direction of the UAV 300 with the first end 341a being as an axis. That is, the landing member of the UAV 300 may be integral with the housing in the closed state, and may protrude to the outside of the housing in the open state. In other words, the landing member which serve as at least part of the housing upon flying may protrude to the outside of the housing upon landing. Alternatively, at least part of the housing may be the landing member by protruding to the outside.

Figure 4:
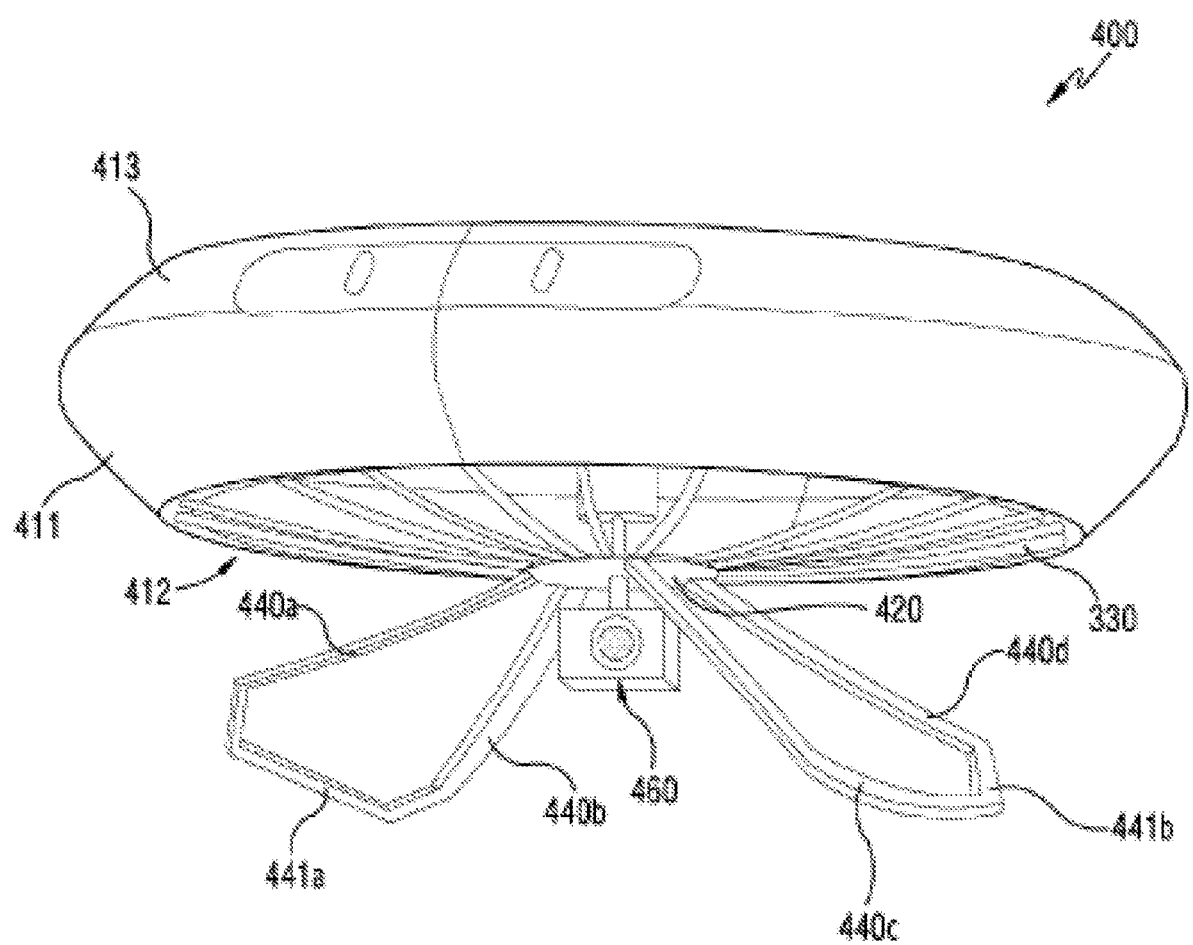
FIG. 4 is a perspective view illustrating an open state of a UAV according to various embodiments of the disclosure.

FIG. 4 is a perspective view illustrating an open state of a UAV according to various embodiments of the disclosure. Meanwhile, detailed descriptions of the same or similar configurations as those described in FIG. 3A and FIG. 3B will be omitted.

Referring to FIG. 4, a UAV 400 may include a landing member consisting of landing members 440a to 440d.

In various embodiments, the landing member may include a skid which couples ends of a pair of landing members. For example, ends of the first landing member 440a and neighboring second landing member 440b may be coupled with a first skid 441a. In addition, ends of the third landing member 440c and fourth landing member 440d respectively symmetric to the first landing member 440a and the second landing member 440b with respect to a center portion 420 may be coupled with a second skid 441b. Each of the skids 441a and 441b may improve rigidity and balance of the landing members. According to various embodiments, in the closed state, the skids 441a and 441b may be in contact with a circumferential portion of the lower housing. In addition, in the open state, the skids 441a and 441b may be spaced apart from the circumferential portion of the lower housing. According to various embodiments, the landing members 440a to 440d of the open state may increase an area of a portion which is in contact with the ground through the skids 441 and 441b upon landing of the UAV. Accordingly, the UAV 400 may be reliably supported from the ground through the skids 441a and 441b.

According to various embodiments, the UAV 400 may be equipped with various accessories (e.g., cradles, external batteries, camera devices). The center portion 420 may have at least one fastener (not shown) capable of mounting various accessories. For example, a camera device 460 may be mounted through the fastener at the center portion of the lower housing. According to various embodiments, the landing members 440a to 440d may be driven in the open state to maintain a specific interval between the UAV 400 and the ground. Accordingly, since the landing members 440a to 440d are first in contact with the ground upon landing, not only an exterior of the UAV 400 but also an accessary such as the camera device 460 can be prevented from being damaged.

Figure 5:
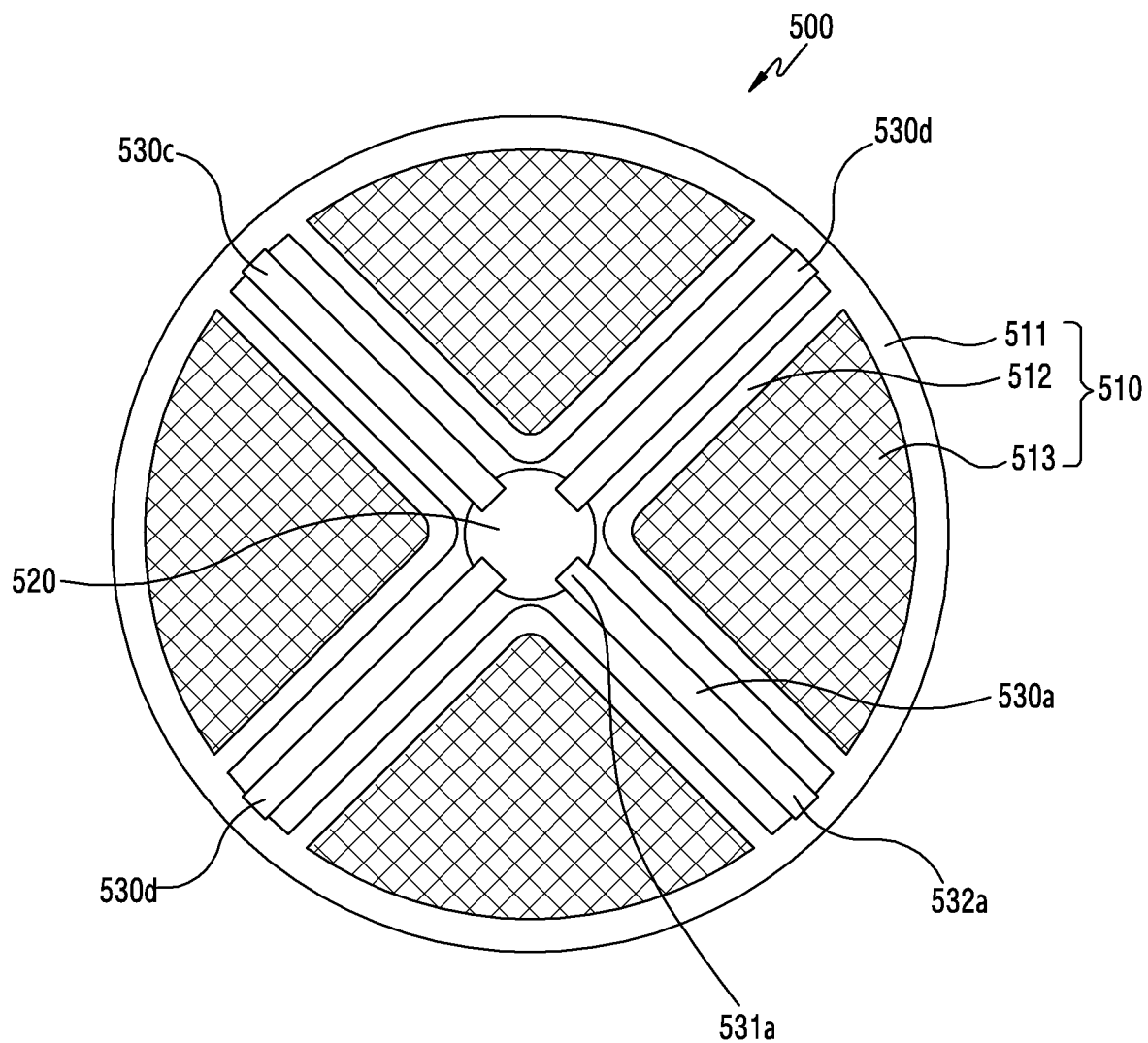
FIG. 5 is a cross-sectional view illustrating an exterior of a UAV, when viewed from below, according to various embodiments of the disclosure.

FIG. 5 is a cross-sectional view illustrating an exterior of a UAV, when viewed from below, according to various embodiments of the disclosure. Meanwhile, detailed descriptions of the same or similar configurations as those described in FIG. 3A will be omitted.

Referring to FIG. 5, a UAV 500 according to various embodiments may include a lower housing 510, a center portion 520, and landing members 530a to 530d.

The lower housing 510 may be constructed in a concave disc shape. The lower housing 510 may protect the UAV 500 from an external obstacle. According to various embodiments, the lower housing 510 may include a circumferential portion 511, a branch portion 512, and a protection portion 513.

The landing members 530a to 530d according to various embodiments may include the first landing member 530a, second landing member 530b, third landing member 530c, and fourth landing member 530d each of which is constructed in a bar shape. That is, the landing member may consist of four landing members. Each of the landing members 530a to 530d may be disposed to be spaced apart by a specific included angle with respect to the center portion 520 of the lower housing 510. In addition, each of the landing members 530a to 530d may be disposed to the center portion 520 in an 'X' shape. In other words, each of the landing members 530a to 530d may be arranged to have an included angle of 90 degrees with the center portion 520 being in the center. Alternatively, each of the landing members 530a to 530d may be disposed symmetrically with the center portion 520 being in the center. However, the embodiment is not limited thereto, and the number of landing members may be at least 3 or 5. The landing member may be disposed in a circumferential direction to be equiangular from the center portion of the housing. For example, if the number of landing members is 5, each landing member may be disposed to have an angle of 120 degrees with the center portion 520 being in the center. Alternatively, the number, shape, and arrangement state of the landing members may be variously adjusted to reliably support a load of the UAV. Although a case where the number of landing members is 4 is taken for example hereinafter for convenience of explanation, the scope of the disclosure is not limited thereto, and thus various embodiments may be included depending on the determined number landing members.

According to various embodiment, one end of each of the landing members 530a to 530d may be disposed to the center portion in a rotatable manner, and the other end opposite to the one end may be in contact with a circumferential portion of the lower housing. For example, a first end 531a of the first landing member 530a may be disposed to the center portion 520 in a hinge structure, and a second end 532a may be in contact with the circumferential portion 511 of the housing 510 in a state of not being coupled thereto.

A branch portion and a protection portion may be included in a space between the landing members 530a to 530d arranged in an 'X' shape. For example, the branch portion 512 and the protection portion 513 may be included in a space between the first landing member 530a and the second landing member 530b. The branch portion 512 may construct two extension portions by being extended towards a center of the lower housing 510 from the circumferential portion 511. A space constructed by the branch portion 512 and the circumferential portion 511 may include the protection portion 513. According to various embodiments, the protection portion 513 may include a specific vent which is constructed in a mesh type to circulate an air flow. Likewise, an upper housing of the UAV may also be constructed in a mesh type. Therefore, the protection portion 513 may provide a function of protecting internal components of the UAV from an external obstacle and a function as a vent through which an air flow occurring by a rotor blade can pass. That is, the housing of the UAV 300 including the protection portion 513 may provide a function of the vent through which the air flow occurring by the rotor blade passes, while protecting the internal components of the UAV such as a rotor blade, a propulsion unit, or the like from the external obstacle omni-directionally.

Figure 6:
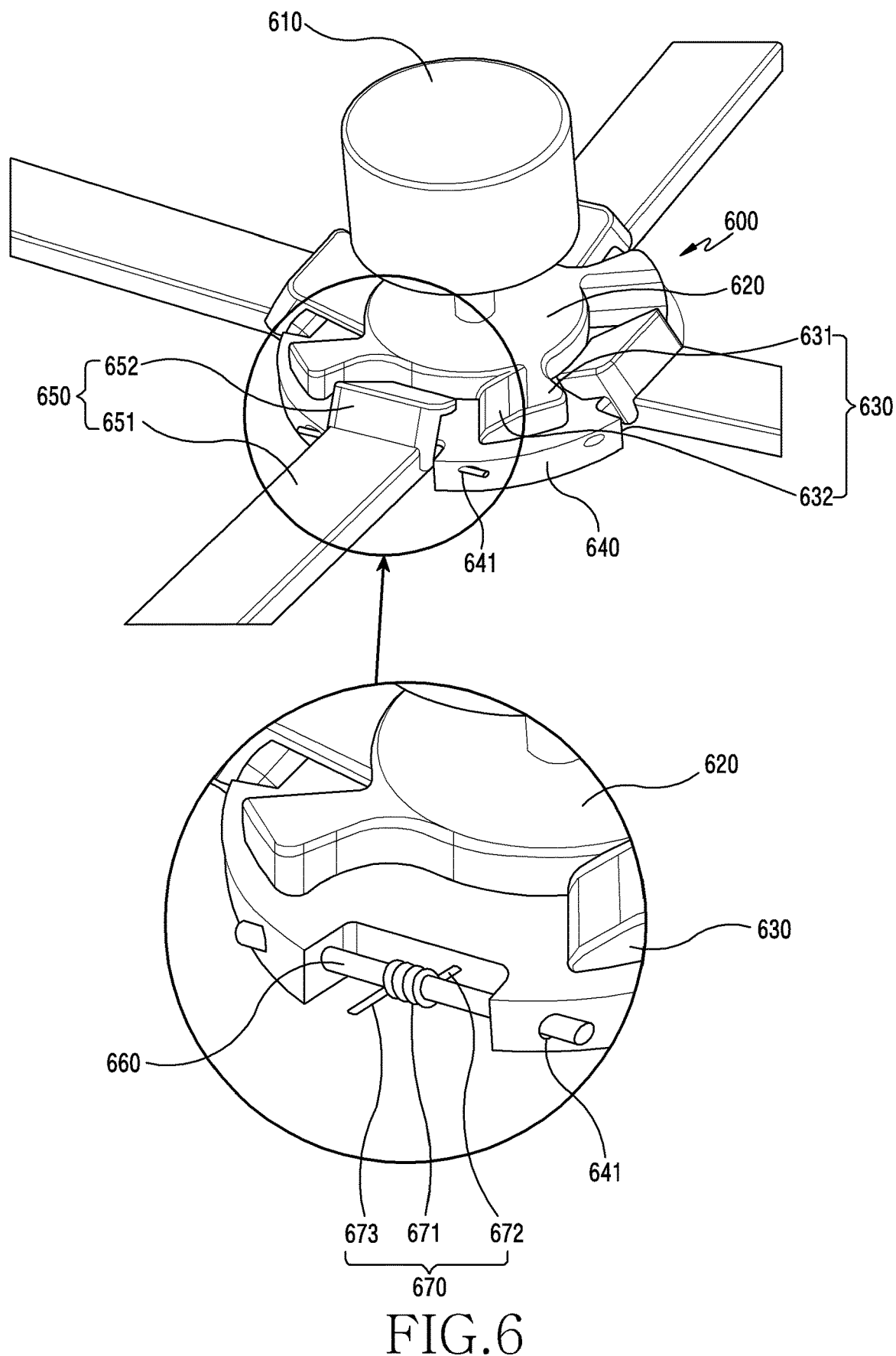
FIG. 6 is a perspective view illustrating a landing module which drives a landing member of a UAV according to various embodiments of the disclosure.

FIG. 6 is a perspective view illustrating a landing module which drives a landing member of a UAV according to various embodiments of the disclosure.

Referring to FIG. 6, a landing module 600 may include a landing motor 610 and a rotor 620. The rotor 620 may be disposed on a center portion 640 of a lower housing in a rotatable manner. The landing motor 610 may be disposed to an upper portion of the rotor. According to various embodiments, the landing motor may be disposed to a lower portion of a central bracket of the UAV. In addition, a landing member 650 may be disposed to the lower center portion 640 in a rotatable manner.

The landing motor 610 according to various embodiments may produce rotation force which varies depending on a change of a control signal. That is, the landing motor 610 may be driven to rotate the rotor 620 in a clockwise or counterclockwise direction according to the control signal. For example, when a first control signal is input, the rotor 620 may rotate in a clockwise direction by the landing motor 610, and when a second control signal is input, the rotor 620 may rotate in a counterclockwise by the landing motor 610. The landing motor 610 may use a typical motor, or may use a geared motor. The rotation force of the landing motor 610 is not limited to be directly delivered to the rotor 620 as in the embodiment. Thus, if a function of delivering the rotation force of the landing motor 610 to the rotor 620 can be performed, the rotation force or a rotation speed may be adjusted by selecting one gear structure or a plurality of gear structures.

The rotor 620 according to various embodiments may include a cam structure 630. According to various embodiments, the rotor 620 may include the cam structure 630 of which the number and arrangement position correspond to the number and arrangement position of the landing member 650. In addition, the cam structure 630 may be arranged in a side face of the rotor. The cam structure 630 may include an inclined portion 632 inclined in a rotation direction and a planar portion 631 disposed sequentially from the inclined portion.

According to various embodiments, the landing member 650 may include a bar-shaped body 651 and a cam interlocking portion 652 constructed at one end of the landing member 650. In addition, the landing member 650 may be disposed to the center portion 640 in a rotatable manner.

An end of the body 651 may be coupled to the center portion 640 in a flexible manner. Specifically, it may be disposed in a downward direction of the center portion 640 in a rotatable manner. For example, the landing member 650 may be hinge-coupled by a hinge pin 660 which penetrates a hole 641 of the center portion 640 and at least part of one end of the landing member 650. Therefore, the landing member 650 may rotate in a downward direction of the center portion 640 of the lower housing with the hinge pin 660 being as an axis. That is, the landing member 650 may protrude from the outside of the lower housing with the hinge pin 660 being as an axis.

The cam interlocking portion 652 may be constructed by protruding to an upper face of the landing member 650. The cam interlocking portion 652 may include a cam accommodating space capable of accommodating the cam structure 630 of the rotor 620. The cam accommodating space may provide a path through which the cam structure 630 is movable by being inserted by a rotation of the rotor 620. An interlocking operation of the cam interlocking portion 652 and cam structure 630 will be described below in greater detail.

According to various embodiments, the hinge pin 660 may include an elastic member 670. The elastic member 670 may include a coil portion 671, a fixed end 672, and a free end 673. The coil portion 671 may be disposed to surround the hinge pin 660. Alternatively, the hinge pin 660 may be arranged to penetrate the coil portion 671 of the elastic member 670. The fixed end 672 may be fixed to one side of the center portion 640. The free end 673 may be arranged in a lower face of the landing member 650, or may be fixed at one end of the landing member 650. According to various embodiments, the elastic member 670 may be supported from the fixed end 672 and thus the free end 673 may push down one end of the landing member. That is, elastic force of the elastic member 670 may allow the landing member 650 not to rotate in a downward direction of the center portion 640 with the hinge pin 660 being as an axis. Alternatively, the elastic member 670 may press the landing member 650 in a direction of being matched to an outer face of the housing. Alternatively, the landing member 650 may maintain a closed state by using the elastic member 670.

Figure 7:
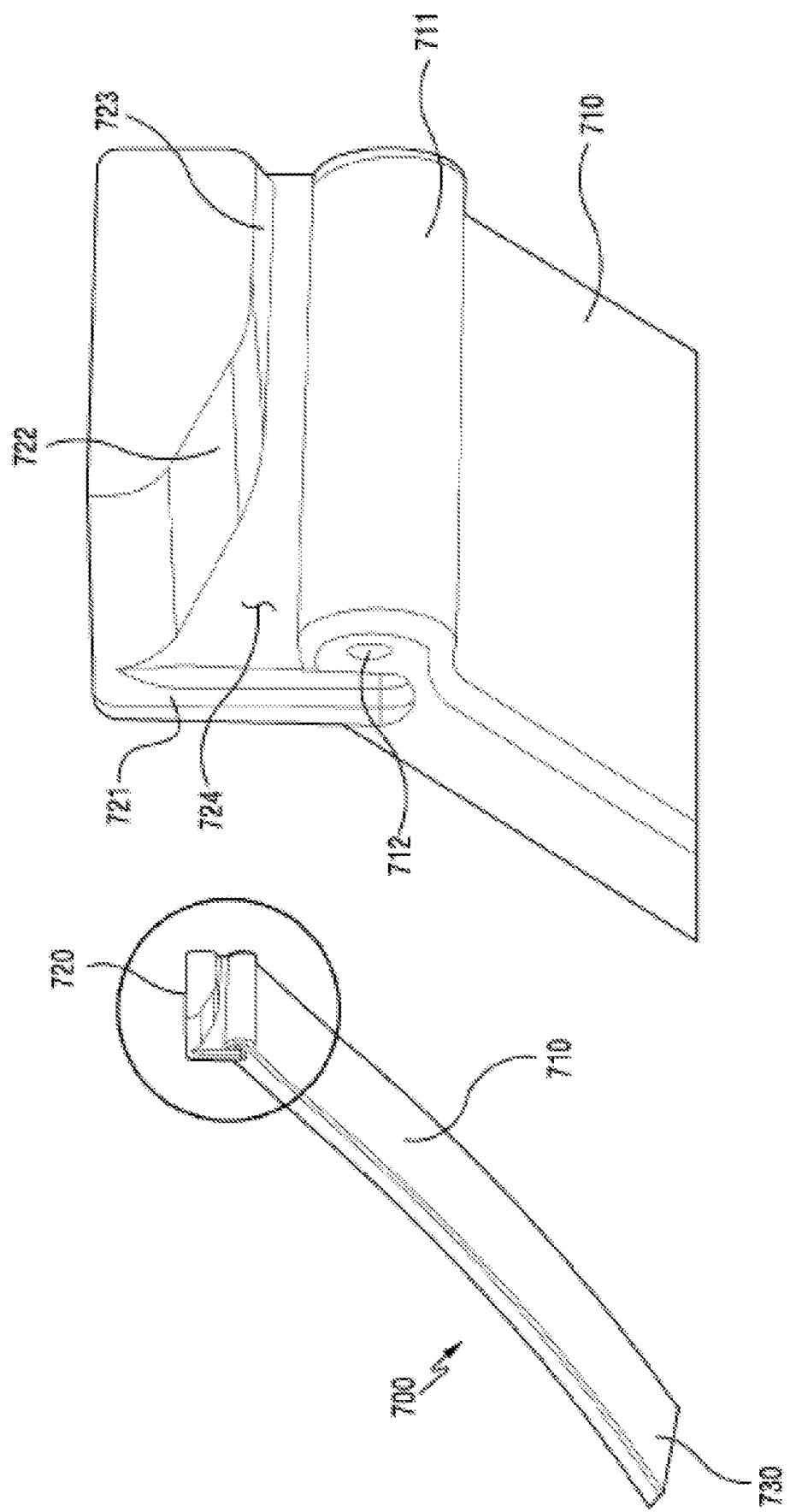
FIG. 7 is a perspective view illustrating a landing member of a UAV according to various embodiments of the disclosure.

FIG. 7 is a perspective view illustrating a landing member of a UAV according to various embodiments of the disclosure.

Referring to FIG. 7, a landing member 700 according to various embodiments may include a body 710 having a specific length and a cam interlocking portion 720. A hinge arm 711 may be constructed at one end of the body 710 of the landing member 700 and a support portion 730 may be constructed at the other end of the body 710, which is opposite to the one end. The body 710 may have a specific length. For example, the body 710 according to various embodiments may have a length from a center portion of the housing to a circumferential portion. Alternatively, the landing member 700 may include the same or similar shape as a comb pattern unit member of the housing.

The hinge arm 711 of the landing member 700 according to various embodiments may be disposed in a rotatable manner with respect to the center portion 640. For example, the hinge arm 711 may include a hinge hole 712. The landing member 700 may be disposed in a rotatable manner by means of the hinge pin 660 which penetrates the hinge hole 712 and the hole 41 of the center portion 640. According to various embodiments, the hinge arm 711 may include an accommodating groove. The accommodating groove may provide a space in which the elastic member 670 of the hinge pin 660 is accommodated, when the hinge arm 711 is disposed to the center portion 640.

According to various embodiments, the cam interlocking portion 720 may include a protrusion portion 721, an inclined portion 722, and a planar portion 723. The cam interlocking portion 720 may include the protrusion portion 721 which protrudes from one side of the hinge arm 711 of the body 710. The inclined portion 722 and the planar portion 723 may be constructed from the protrusion portion 721 towards the hinge arm 711. In addition, the inclined portion 722 and the planar portion 723 may construct a cam accommodating space 724 together with the hinge arm 711. The cam accommodating space 724 may construct a path through which a cam structure of a rotor can be inserted and moved.

Upon landing of the UAV, the support portion 730 may protrude from the housing and be directly in contact with the ground to provide a function of supporting a load of the UAV. Alternatively, an exterior of the housing can be prevented from being damaged when the housing of the UAV is directly in contact with the ground. In other words, the support portion 730 may be in contact with the ground in an open state. On the contrary, when the UAV is in flight, the support portion 730 may be arranged to be in contact with the housing to be integral with the outer face of the housing. In other words, in the closed state, the support portion 730 may serve as part of the housing. Alternatively, in the closed state, a landing member including the support portion 730 may be substantially integral with the housing.

According to various embodiments, the landing member 700 may rotationally move with the hinge arm 711 being as an axis. Alternatively, the cam interlocking portion 720 and support portion 730 of the landing member 700 may reciprocally move with the hinge arm 711 being as an axis. In other words, the cam interlocking portion 720 and support portion 730 of the landing member may move in a seesaw manner with respect to the hinge arm 711. For example, when a cam structure of a rotor is inserted to the cam accommodating space 724 of the cam interlocking portion 720, the cam interlocking portion 720 may be pushed up by the cam structure. Alternatively, the cam interlocking portion 720 may be pushed up by being pressed in a vertical direction by the cam structure. At the same time, the hinge arm 711 may rotate so that the support portion 730 can protrude from the housing. Therefore, the landing member 700 may operate in the open state and the closed state by an interference operation of the cam interlocking portion 720 and cam structure.

Figure 8A:
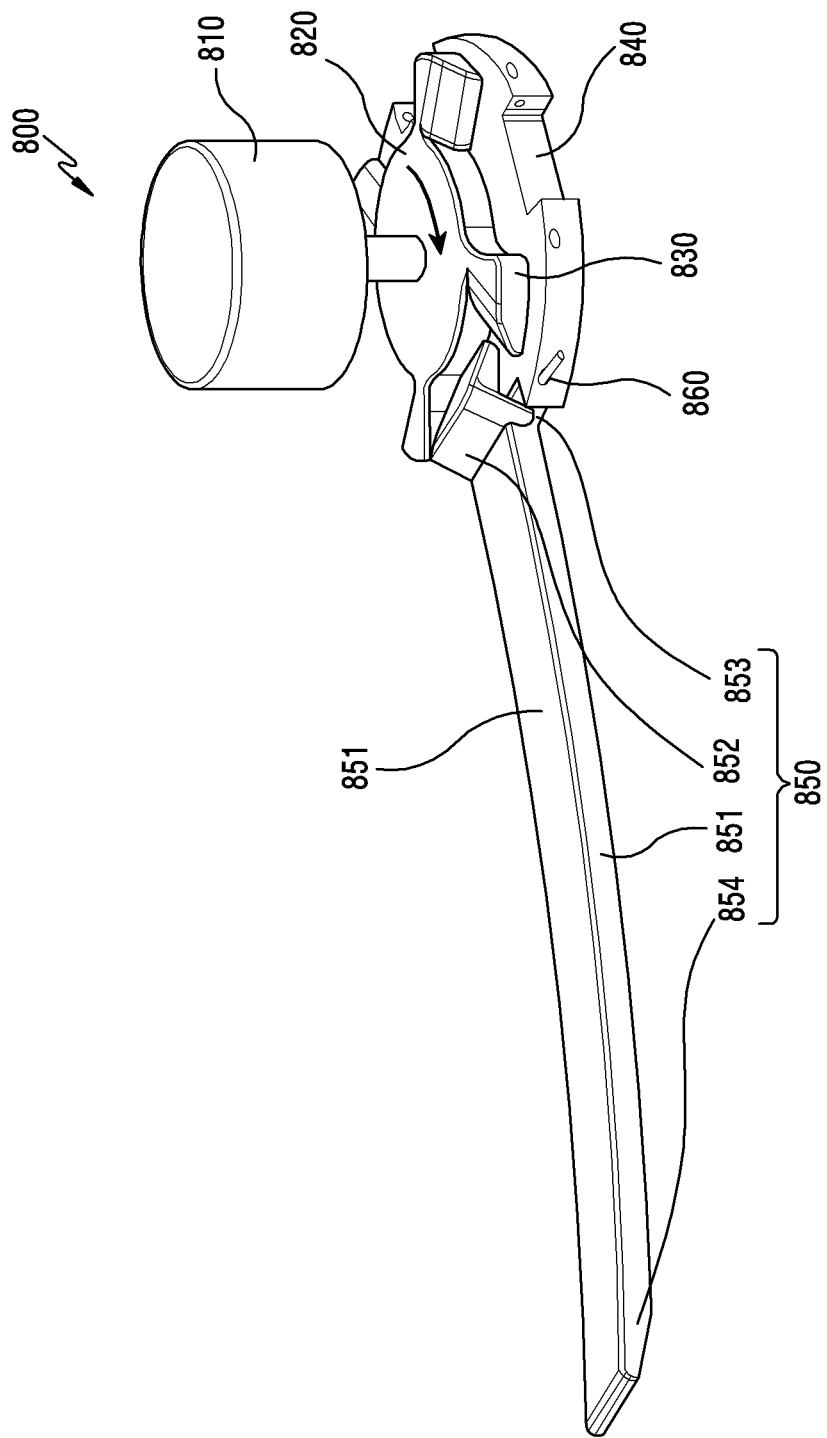
FIG. 8A is a perspective view illustrating a case where a landing member of a UAV is in a closed state.
Figure 8B:
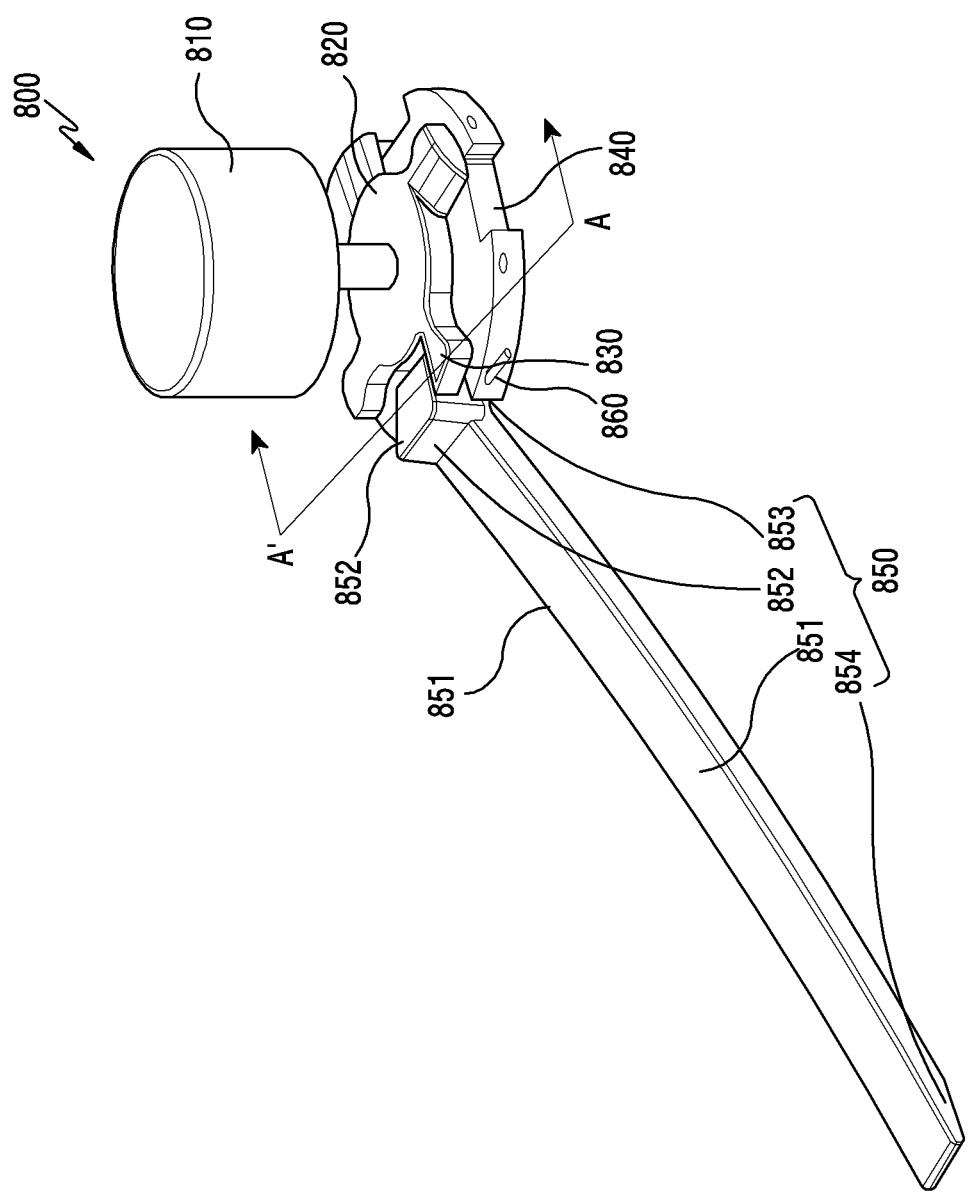
FIG. 8B is a perspective view illustrating a case where a landing member of a UAV is in an open state according to various embodiments of the disclosure.

FIG. 8A is a perspective view illustrating a case where a landing member of a UAV is in a closed state, and FIG. 8B is a perspective view illustrating a case where a landing member of a UAV is in an open state according to various embodiments of the disclosure.

Figure 8C:
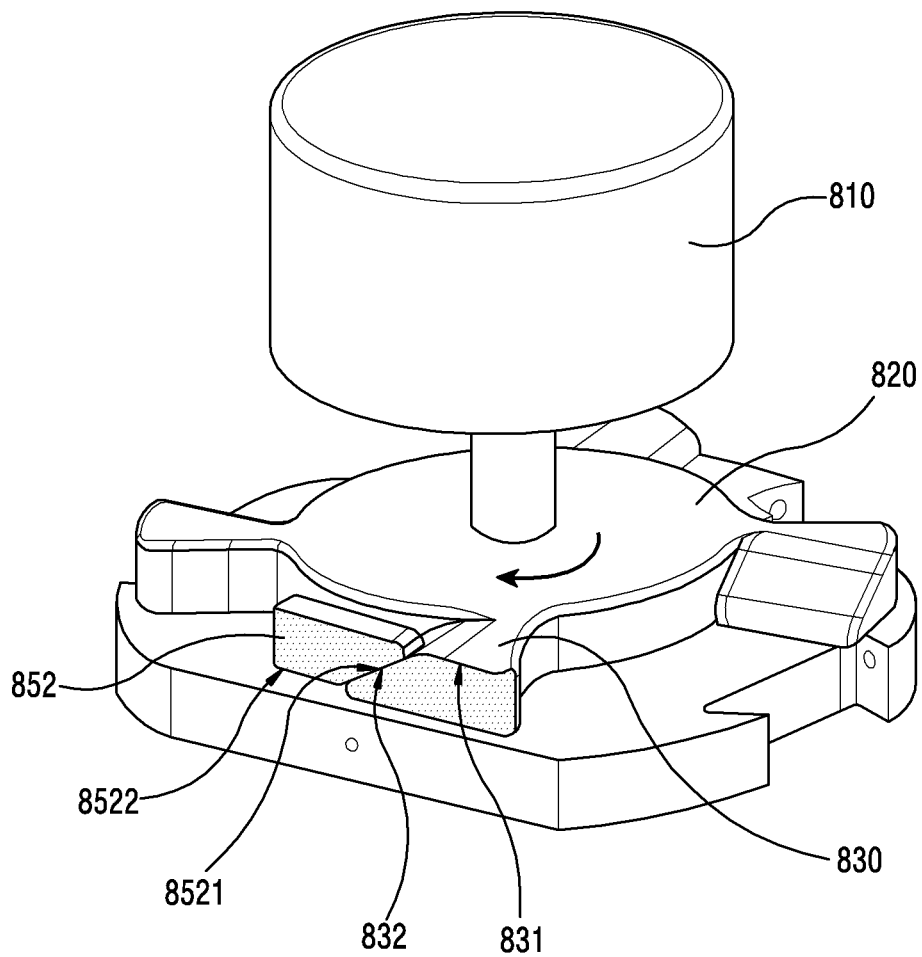
FIG. 8C is a perspective view illustrating a cross-section, cut along the line A-A' of FIG. 8B, according to various embodiments of the disclosure.

FIG. 8C is a perspective view illustrating a cross-section, cut along the line A-A' of FIG. 8B, according to various embodiments of the disclosure.

Hereinafter, referring to FIG. 8A to FIG. 8C, an operation of driving a landing member will be described. A landing member of a UAV may include a plurality of landing members. However, for convenience of explanation, an operation of driving one landing member will be described. In addition, detailed descriptions of the same or similar configurations as those described in FIG. 6 and FIG. 7 will be omitted.

Referring to FIG. 8A, a landing member 850 according to various embodiments may include a body 851 having a specific length and a cam interlocking portion 852. A hinge arm 853 may be constructed at one end of the body 851 of the landing member 850 and a support portion 854 may be constructed at the other end of the body 851, which is opposite to the one end. The body 851 may have a specific length. For example, the body 851 according to various embodiments may have a length from a center portion of the housing to a circumferential portion. The landing member 850 according to various embodiments may be substantially co-planar with a center portion 840 of the housing, and thus the support portion 854 may be in contact with a circumferential portion of the lower housing. Alternatively, the UAV may operate in a closed state of the landing member 850.

According to various embodiments, the landing member 850 may be disposed to the center portion 840 in a rotatable manner. For example, the hinge arm 853 of the center portion 840 may be coupled such that a rotational movement is by a hinge pin 860. However, the closed state may be maintained by an elastic member 770 disposed to the hinge pin 860.

According to various embodiments, upon landing of the UAV 100, the landing module 130 may transmit a first signal to a landing motor 810. The landing motor 810 may rotate in a clockwise direction according to the first signal. When a rotor 820 rotates in the clockwise direction by the landing motor 810, a cam structure 830 of the rotor 820 may be inserted into a cam accommodating space of the cam interlocking portion 852. Since the cam structure 830 is inserted into the cam accommodating space, the cam interlocking portion 852 may be pushed up in a vertical direction with respect to the center portion 840. On the other hand, since the cam interlocking portion 852 is pushed up, the support portion 854 may be pushed down in a downward direction of the center portion 840. That is, the landing member 850 may move in a seesaw manner with the hinge pin 860 being as an axis. According to the above operation, as shown in FIG. 8B, the support portion 854 may be pushed down in a downward direction of the center portion 840. That is, the UAV may operate from the closed state to the open state.

Meanwhile, the operation of changing the landing member from the open state to the closed state may be inferred by inversely using the aforementioned operations. According to various embodiments, upon landing of the UAV 100, the landing module 130 may transmit a second signal to the landing motor 810. The landing motor 810 may rotate the rotor 820 in a counterclockwise direction according to the second signal. Since the rotor 820 rotates in the counterclockwise direction, the cam structure 830 of the rotor 820 may be out of the cam accommodating space of the cam interlocking portion 852. Since the cam structure 830 is out of the cam accommodating space, the cam interlocking portion 852 may be pushed down in a downward direction with respect to the center portion 840. That is, when the cam structure 830 is out of the cam accommodating space, the cam interlocking portion 852 may be pushed down in a downward direction with respect to the center portion 840 by means of the elastic member 770 included in the hinge pin 860. On the contrary, since the cam interlocking portion 852 is pushed down, the support portion 854 may be pushed up in an upward direction of the center portion 840. That is, the landing member 850 may move in a seesaw manner with the hinge point 860 being as an axis. That is, the UAV may operate from the open state to the closed state.

Therefore, the landing member 850 may operate in the open state or the closed state due to an interlocking operation of the cam structure 830 and cam interlocking portion 852 and elastic force provided by an elastic member.

Referring to FIG. 8C, a process of inserting a cam structure into a cam accommodating space will be described in detail.

According to various embodiments, since the rotor 820 rotates in a clockwise direction, the cam structure 830 may start to be inserted into the cam interlocking portion 852. When the cam structure 830 starts to be inserted into the cam interlocking portion 852, an inclined portion 832 of the cam structure 830 may be in contact with an inclined portion 8521 of the cam interlocking portion 852. When the rotor 820 further rotates in the clockwise direction, the inclined portion 832 of the cam structure 830 may be in contact with a planar portion 8522 of the cam interlocking portion 852 via the inclined portion 8521 of the cam interlocking portion 852. In other words, a planar portion 831 of the cam structure 830 may be sequentially in contact with the inclined portion 8521 and planar portion 8522 of the cam interlocking portion 852 according to the rotation of the rotor 820. In this case, since the planar portion 831 of the cam structure 830 is constructed to be higher than the inclined portion 832, the cam interlocking portion 852 is pushed up in a vertical direction. According to this operation, the cam interlocking portion 852 is pushed up, whereas the support portion 854 of the landing member may be pushed down.

According to various embodiments, the inclined portion and planar portion of the cam structure 830 and cam interlocking portion 852 may include various lengths and heights. A height and time by which the cam interlocking portion 852 is pushed up may be adjusted by adjusting a length and height of each inclined portion and planar portion. In addition, since each of the cam structure 830 and the cam interlocking portion 852 has an inclined portion, sudden shaking can be avoided in the inserting operation. That is, a sudden seesaw operation of the landing member 850 may be avoided to prevent an operation of the landing member 850 from affecting a flying or landing operation of the UAV and to prevent each component of the landing module from being damaged. However, the embodiment is not limited thereto, and thus the cam interlocking portion 852 and/or the cam structure 830 may include only the inclined portion or the planar portion.

Figure 9:
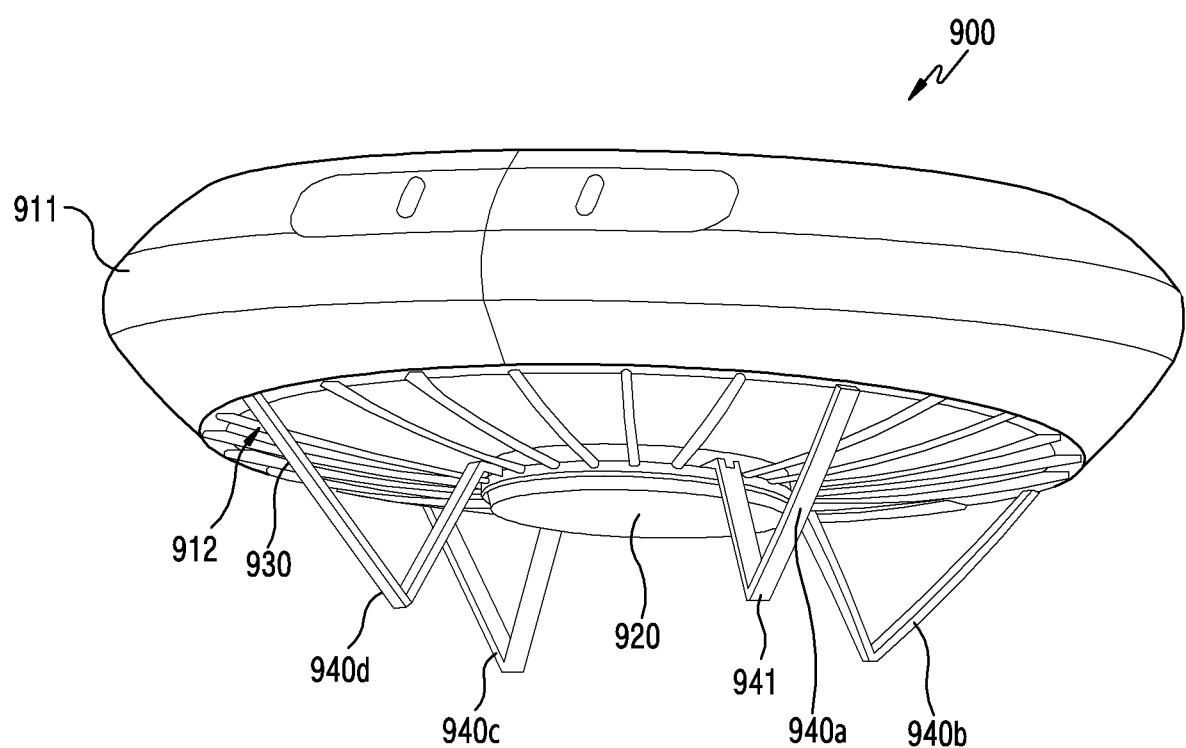
FIG. 9 is a perspective view illustrating an open state of a landing member of a UAV according to various embodiments of the disclosure.

FIG. 9 is a perspective view illustrating an open state of a landing member of a UAV according to various embodiments of the disclosure.

Referring to FIG. 9, a UAV 900 may include an upper housing 911, a lower housing 912, and landing members 940*a* to 940*d*.

According to various embodiments, the landing members 940*a* to 940*d* may be constructed in a link structure. Accordingly, hereinafter, each landing member may be referred to as a link portion. According to various embodiments, link portions 940*a* to 940*d* may include the first link 940*a*, the second link 940*b*, the third link 940*c*, and the fourth link 940*d*. According to various embodiments, the links 940*a* to 904*d* may be unfolded by a landing module included in the UAV and thus may protrude to the outside of the lower housing 912. This state may be referred to as an open state, an unfolded state, and a landing state.

According to various embodiments, a portion which protrudes to the outside may be a link coupling portion 941*a*. That is, upon landing, the UAV 900 may be first in contact with the ground through the link coupling portion 941*a*. That is, upon landing, the UAV 900 may prevent an exterior of the lower housing 912 from being directly in contact with the ground by means of each of the links 940*a* to 940*d*. In other words, upon landing, each of the links 940*a* to 940*b* can protect a damage of the exterior of the UAV 900. Specific operations of the landing module and each of the landing members 940*a* to 940*d* will be described below in greater detail.

Figure 10A:
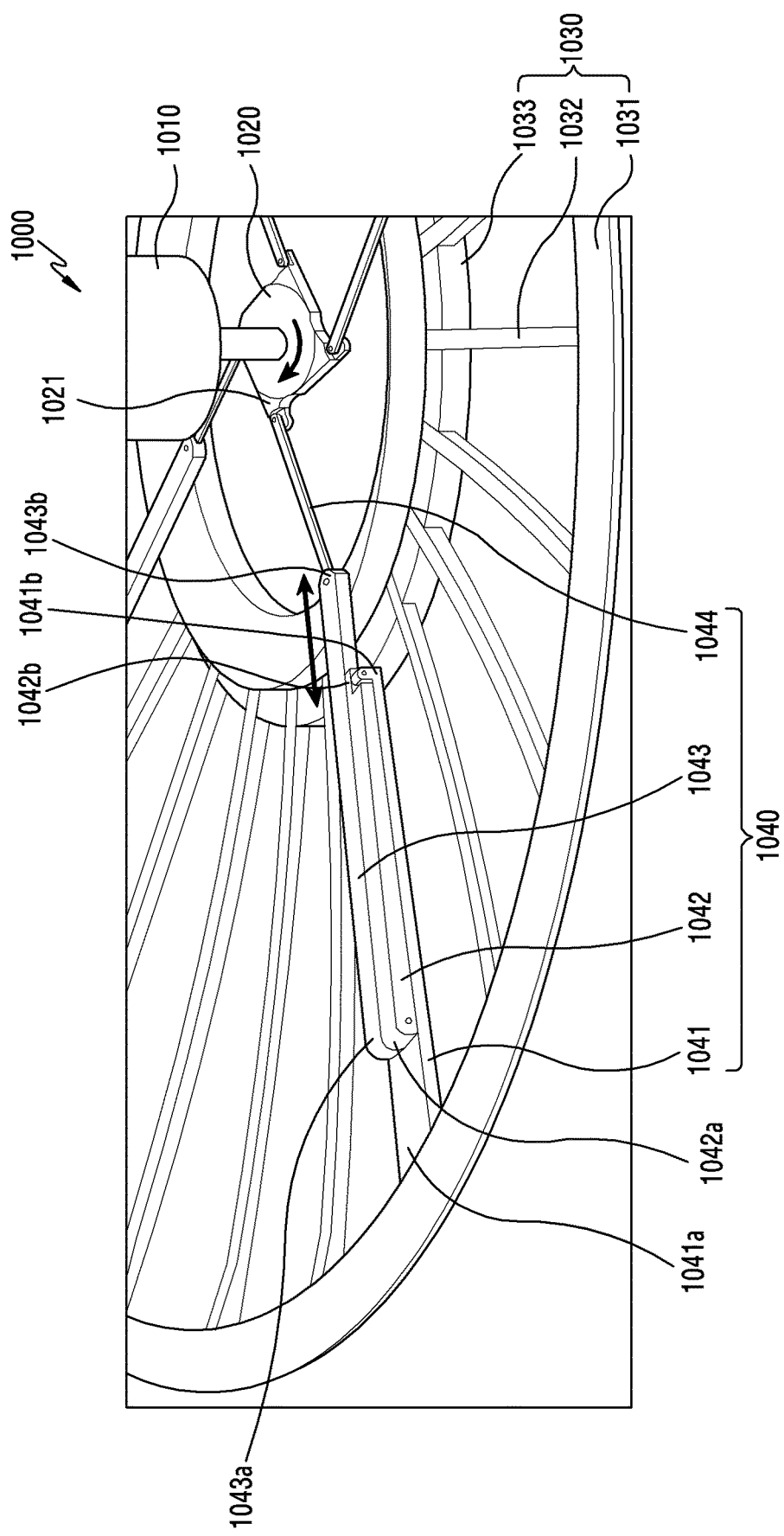
FIG. 10A is a perspective view illustrating a case where a landing member of a UAV is in a closed state according to various embodiments of the disclosure.
Figure 10B:
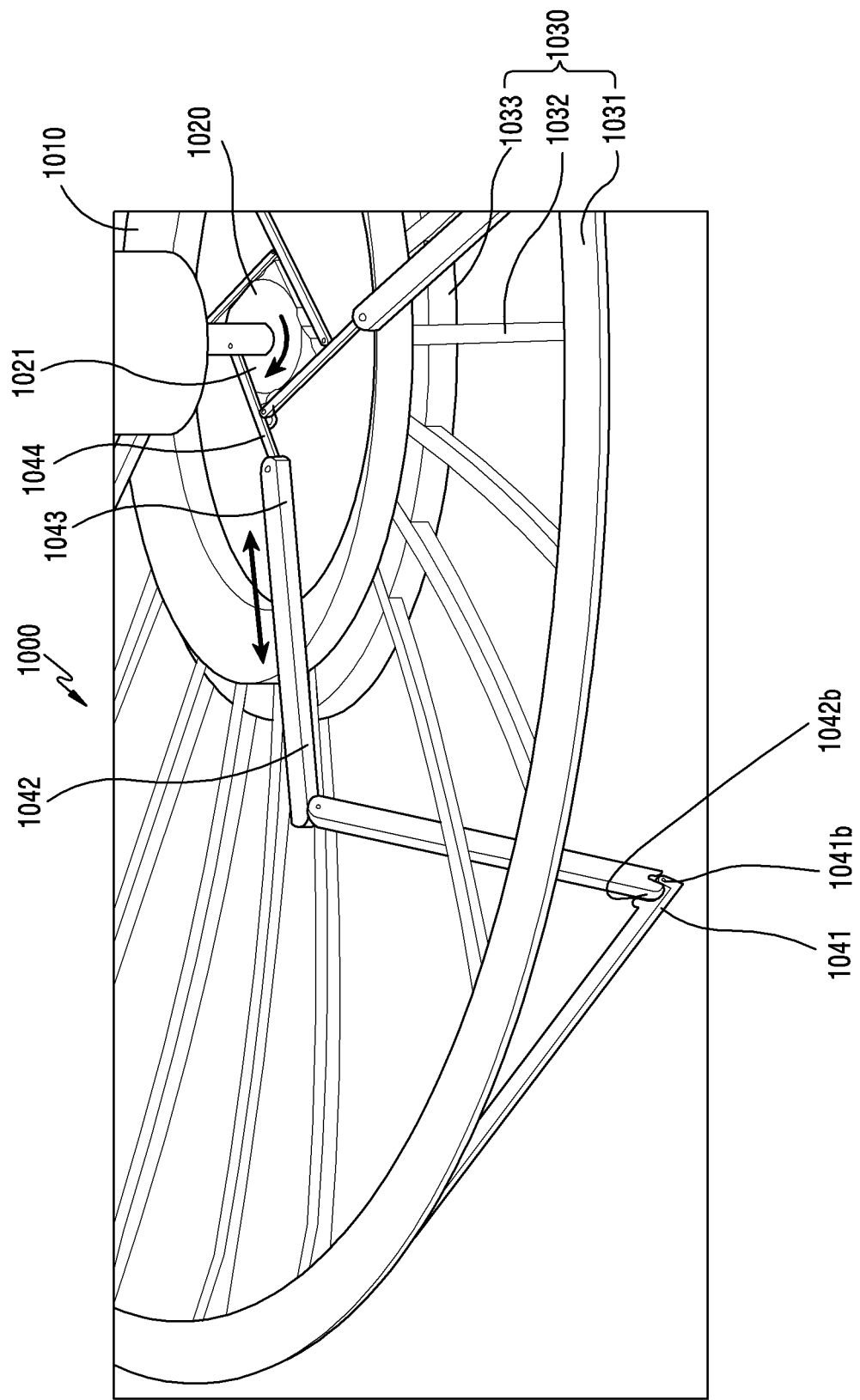
FIG. 10B is a perspective view illustrating a case where a landing member of a UAV is in an open state according to various embodiment of the disclosure.

FIG. 10A is a perspective view illustrating a case where a landing member of a UAV is in a closed state according to various embodiments of the disclosure, and FIG. 10B is a perspective view illustrating a case where a landing member of a UAV is in an open state according to various embodiment of the disclosure.

Referring to FIG. 10A and FIG. 10B, a process of operating landing members including a plurality of links will be described in detail.

An UAV 1000 according to various embodiments may include a landing motor 1010, a rotor 1020, a lower housing 1030, and a landing member 1040. The landing member 1040 may be configured in a link structure. Therefore, hereinafter, the landing member 1040 may be referred to as a link portion.

The lower housing 1030 according to various embodiments may include an external lower housing 1031, an internal lower housing 1033, and a plurality of comb pattern unit members 1032. The external lower housing 1031 and the internal lower housing 1033 may be constructed in a ring shape. The plurality of comb pattern unit members 1032 may be arranged radially between the external lower housing 1031 and the internal lower housing 1033. Alternatively, the plurality of comb pattern unit members 1032 may be disposed in a circumferential direction with a specific included angle towards the external lower housing 1031 from the internal lower housing 1033. In other words, the plurality of comb pattern unit members 1030 may be spaced apart from each other by a specific interval and may be disposed by being radiated from the internal lower housing 1033. Therefore, a space between the plurality of comb pattern unit members 1030 may be a vent having a specific area through which an air flow occurring by a rotor blade of a propulsion unit can pass. Likewise, the upper housing may also include the vent having the specific area through which the air flow occurring by the rotor blade of the propulsion unit can pass.

The link portion 1040 according to various embodiments may include a plurality of links. Although a case where the number of links is 4 is taken for example hereinafter for convenience of explanation, the scope of the disclosure is not limited thereto, and thus the number of links and an arrangement state may be various.

The link portion 1040 according to various embodiments may be arranged radially between the external lower housing 1031 and the internal lower housing 1032, similarly to the plurality of comb pattern unit members 1033. Alternatively, the plurality of comb pattern unit members 1033 may be disposed in a circumferential direction with specific an included angle towards the external lower housing 1031 from the internal lower housing 1032. Alternatively, each link portion 1040 may be coupled to the internal lower housing 1032 in an 'X' shape. In other words, each link portion 1040 may be disposed to have an included angle of 90 degrees with the internal lower housing 1032 being in the center.

According to various embodiments, the link portion 1040 may include a first link 1041, a second link 1042, a third link 1043, and a third link 1044. A first end 1041*a* of the first link 1041 may be coupled to the external lower housing 1031, and a second end 1041*b* may be coupled to a first end 1042*b* of the second link 1042. A second end 1042*a* of the second link may be coupled to a first end 1043*a* of the third link 1043. Both ends of the fourth link 1044 may be respectively coupled to a second end 1043*b* of the third link 1043 and the rotation plate 1020. In this case, the link portions 1041 to 1044 may be coupled so that a rotatable movement is possible.

According to various embodiments, the third link 1043 may linearly move in a direction of a circle center on the internal lower housing 1032. The fourth link 1044 which couples between the third link 1043 and the rotor 1020 may provide a function of changing a rotational movement of the rotor 1020 to a linear movement of the third link 1043.

Referring to FIG. 10A, the first link 1041, the second link 1042, and the third link 1043 according to various embodiments may be substantially co-planar. That is, it is possible to be arranged not to be exposed to the outside of the lower housing 1030 between the external lower housing 1031 and the internal lower housing 1032, similarly to the plurality of comb pattern unit members 1033. That is, a function of protecting a propulsion unit (not shown) including a rotor blade may be provided together with the comb pattern unit member 1033. This state may be referred to as a closed state, a folded state, or an airborne state.

Referring to FIG. 10B, the third link 1043 according to various embodiments may move towards a center by an operation of the rotor 1020 and fourth link 1044. According to such an operation, the first link 1041 may move in a rotatable manner in a downward direction with the first end 1041*a* being as an axis. In addition, all of the first link 1041, the second link 1042, and the third link 1043 may operate in an unfolded state, and the second end 1041*b* of the first link 1041 and the first end 1042*b* of the second link 1042, which are coupled to each other, may operate to protrude in a downward direction of the lower housing 1030. In other words, the links 1041 to 1044 of the link 1040 may be unfolded by an operation of the rotor 1020 to protrude to the outside of the lower housing 1030. This state may be referred to as an open state, an unfolded state, and a landing state.

Figure 11:
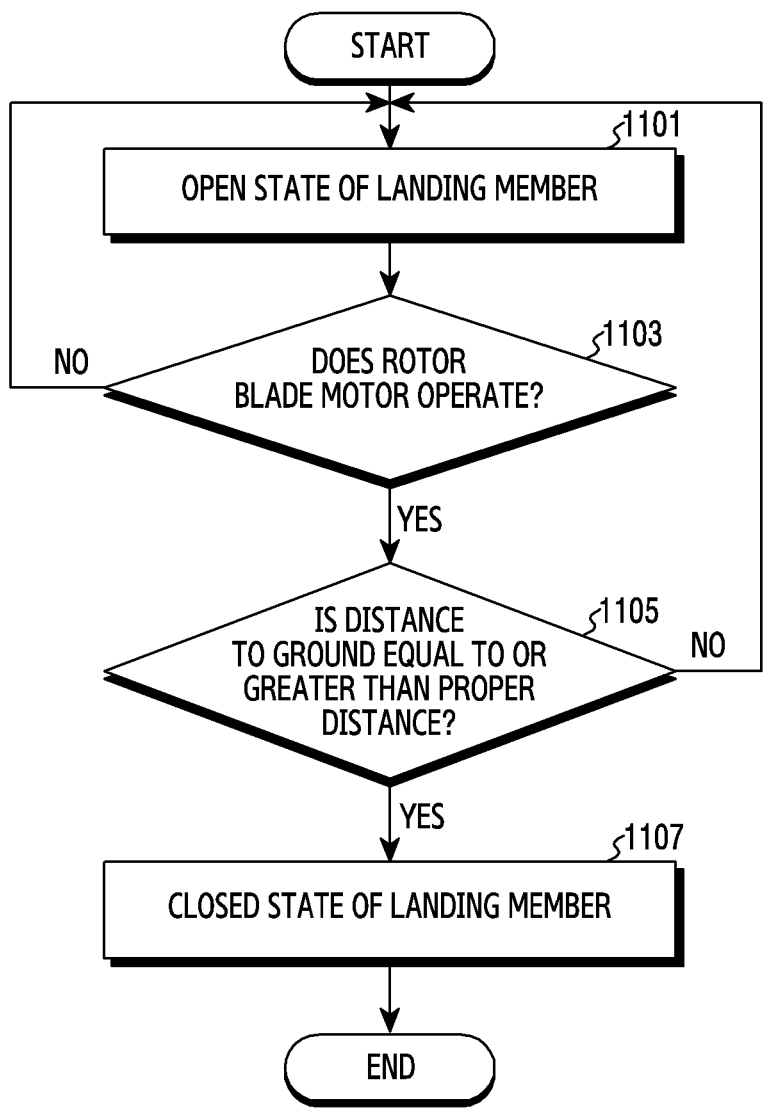
FIG. 11 is a flowchart illustrating a taking-off operation of a UAV according to various embodiments of the disclosure.

FIG. 11 is a flowchart illustrating a taking-off operation of a UAV according to various embodiments of the disclosure. In FIG. 11, it is assumed that the UAV starts in an open state of a landing member. The open state may represent a state where the landing member protrudes to the outside of a housing as shown in FIG. 3B. In addition, the open state may refer to an unfolded state or a landing state.

Before taking off, the UAV may operate in an unfolded state of the landing member or may maintain the unfolded state (step 1101). In this case, the processor 110 may receive a flight start signal of a controller, which is received through the communication module 150. If it is determined that the landing member is not in the unfolded state, the processor 110 may unfold the landing member through the landing module 130.

The processor 110 may determine whether a motor for rotating a rotor blade operates (step 1103). For example, the processor 110 may receive a manipulation signal of the controller through the communication module 150 to determine whether the motor operates. Alternatively, whether the motor operates may be determined through an MPU of the movement module 120.

If it is determined that the motor does not operate, returning to step 1101, the processor 110 may maintain the unfolded state of the landing member (step 1101).

On the other hand, if it is determined that the motor operates and the rotor blade rotates, the processor 110 may determine whether a distance between the UAV and the ground is separated by a pre-set proper distance (step 1105). In this case, the UAV may slowly take off from the ground by using propulsion force produced through the rotation of the rotor blade. In this case, the processor 110 may receive from the sensor module 140 the information on the distance to the ground. Specifically, the processor 110 may receive the information on the distance between the UAV and the ground through the ultrasonic sensor 146 which outputs an ultrasonic wave to measure a signal reflected from an object and to measure the distance and the optical flow 147 which recognizes a ground terrain or pattern by using a camera or the like to calculate a position.

If it is determined that the distance between the UAV and the ground is not separated by more than the proper distance, the processor 110 may continuously maintain the unfolded state of the landing member.

On the other hand, if it is determined that the UAV is separated from the ground by more than the proper distance, the processor 110 may allow the landing member to operate in the closed state (step 1107). As shown in FIG. 3A, the closed state of the landing member may represent a state where the landing member is substantially integral with the housing. In addition, the closed state may refer to an unfolded state or an airborne state. In this case, the landing module 130 may operate the landing motor capable of unfolding the landing member on the basis of a manipulation signal received from the processor 110. A process in which the landing member operates in the closed state may be identical or similar to operations described in FIG. 8A to FIG. 8C.

In the example of FIG. 11, it is described that the UAV takes off from the ground in an unfolded state of the landing member when the flight starts. However, the embodiment is not limited thereto, and for example, if the flight starts from an additional cradle in a closed state of the landing member or the flight starts in a state where a user directly carries the UAV, the flight may start without the process (step 1101) in which the landing member operates in an unfolded state.

Figure 12:
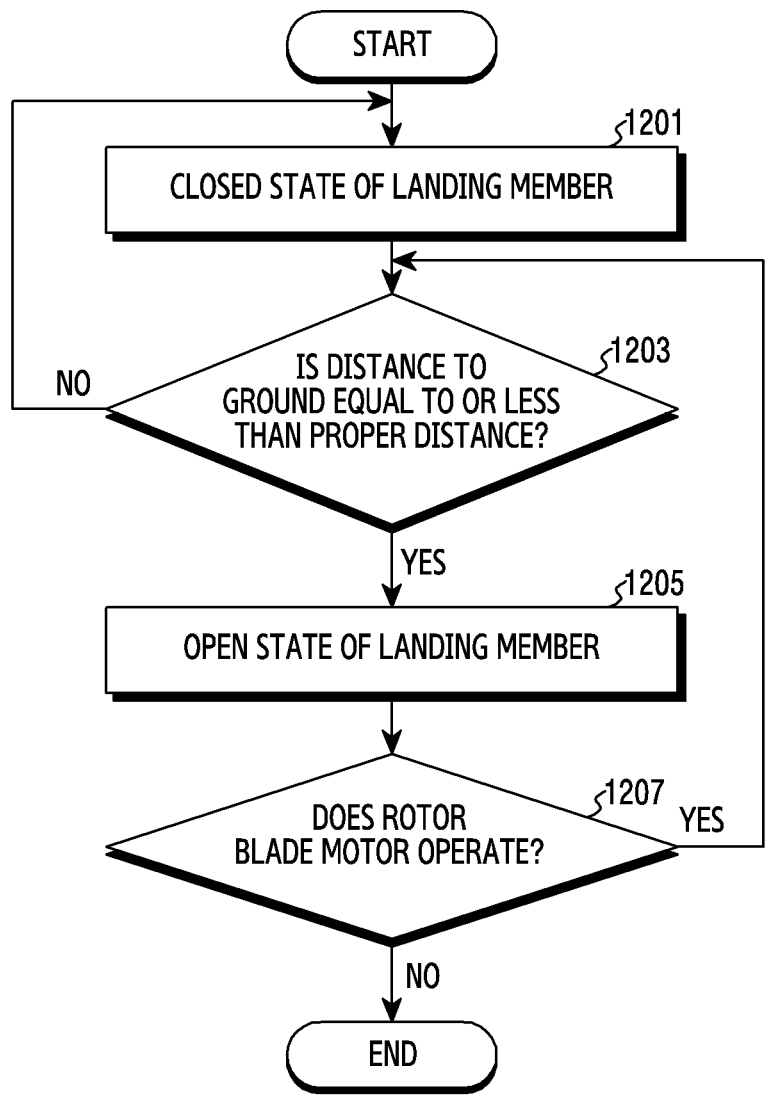
FIG. 12 is a flowchart illustrating a landing operation of a UAV according to various embodiments of the disclosure.

FIG. 12 is a flowchart illustrating a landing operation of a UAV according to various embodiments of the disclosure. It is assumed in FIG. 12 that the UAV starts in a closed state of a landing member.

During the flight, the UAV may operate in the closed state of the landing member or may maintain the closed state (step 1201). In this case, the processor 110 may receive a landing start signal of a controller, which is received through the communication module 150. If the processor 110 determines that the landing member is not in the closed state, the landing member may operate in the closed state through the landing motor of the landing module 130.

The processor 110 may determine whether a distance between the UAV and the ground is separated by a pre-set proper distance (step 1203). In this case, the UAV may reduce a rotation speed of a rotor blade to decrease propulsion force, and thus may slowly descends. In this case, the processor 110 may receive, from the sensor module 140, the information on the distance to the ground. Specifically, the processor 110 may receive the information on the distance between the UAV and the ground through the ultrasonic sensor 146 which outputs an ultrasonic wave to measure a signal reflected from an object and to measure the distance and the optical flow 147 which recognizes a ground terrain or pattern by using a camera or the like to calculate a position.

If it is not determined that the distance between the UAV and the ground is less than or equal to the proper distance, the processor 110 may continuously maintain the closed state of the landing member (step 1201).

On the other hand, if it is determined that the distance between the UAV and the ground is less than or equal to the proper distance, the processor 110 may allow the landing member to operate in the open state (step 1205). That is, the landing member may operate in the open state to prepare the landing.

The processor 110 may determine whether a motor for rotating a rotor blade operates (step 1207). For example, the rotor blade may continuously rotate even if the UAV descends continuously and thus the landing member is in contact with the ground to land. In this case, the UAV may operate again to prepare the flight, or may completely stop the operation. That is, the processor 110 may determine whether a motor of a rotor blade operates in order to completely end the operation of the UAV.

The processor 110 may receive a manipulation signal of the controller through the communication module 150 to determine whether the motor operates. Alternatively, whether the motor operates may be determined through an MPU of the movement module 120.

If it is determined that the motor operates, returning to step 1203, the processor 110 may determine whether a distance between the UAV and the ground is separated by a pre-set proper distance.

Otherwise, if it is determined that the motor stops the operation, the processor 110 may determine that the operation of the UAV is completely finished.

According to various embodiments of the disclosure, if it is determined that the operation of the UAV is completely finished, the processor 110 may allow the landing member to operate in the closed state. For example, after the operation of the UAV is completely finished, the user may operate the landing member in the closed state to store it. In this case, the user may transmit to the UAV a manipulation signal to allow the landing member to operate in the closed state through a controller, and the processor 110 may receive the manipulation signal through the communication module 150, and may transmit a signal to the landing module 130 to operate the landing member.

According to various embodiments of the disclosure, in a series of steps disclosed in FIG. 11 and FIG. 12, the processor 110 may report current state information of the UAV. For example, the UAV may include the various functional components 213 (e.g., a display, a lamp, and a speaker) of the housing exterior. Therefore, the audio module 160 may indicate the current state of the UAV as audio information through the speaker. Alternatively, the application module 102 may indicate the current state as visual information through a display or lamp of the UAV. Alternatively, the application module 102 may persistently transmit the current state information of the UAV to the controller through the communication module 150.

Various exemplary embodiments of the disclosure disclosed in the specification and the drawing are merely a specific example presented for clarity and are not intended to limit the scope of the disclosure. Therefore, in addition to the embodiments disclosed herein, various changes in forms and details made without departing from the technical concept of the disclosure will be construed as being included in the scope of the disclosure.

What is claimed is:

1. An Unmanned Aerial Vehicle (UAV) comprising:
a housing;
a motor arranged in an inner space of the housing;
a rotor that is rotated by the motor and comprises at least one cam structure; and
at least one landing member,
wherein the at least one landing member comprises a cam interlocking portion,
wherein the cam structure comprises a first inclined portion and a first planar portion oriented in a direction for insertion into the cam interlocking portion,
wherein the cam interlocking portion receives the first inclined portion and then the first planar portion, according to the rotation of the rotor, and
wherein the landing member transitions between forming at least part of the housing and protruding from the housing, according to the receiving by the cam interlocking portion.

2. The UAV of claim 1, wherein:
the rotor and the at least one landing member are disposed at a center portion of the housing, and
the cam structure of the rotor causes the at least one landing member to protrude from the housing according to a rotational movement of the rotor.

3. The UAV of claim 2, wherein the housing comprises a plurality of comb pattern unit members spaced apart by a specific interval in a circumferential direction from the center portion of the housing.

4. The UAV of claim 3, wherein the at least one landing member is configured to form a part of the plurality of comb pattern unit members.

5. The UAV of claim 2, wherein the at least one landing member comprises:
a body having a specific length;
a hinge arm constructed at a first end of the body and rotatably coupled to the housing; and
a support portion located at a second end of the body facing the hinge arm and disposed to contact a ground surface upon a landing of the UAV.

6. The UAV of claim 5,
wherein the cam interlocking portion comprises:
a cam accommodating space disposed at one side of the hinge arm and configured to accommodate the cam structure; and
a protrusion portion disposed at a position controlled by the cam structure inside the cam accommodating space.

7. The UAV of claim 6, wherein the hinge arm is configured to cause the support portion of the landing member to protrude from the housing by an operation in which the cam structure is inserted to the cam accommodating space to press the protrusion portion in a vertical direction.

8. The UAV of claim 7, wherein the first inclined portion and the first planar portion are arranged sequentially from a direction in which the cam structure is inserted.

9. The UAV of claim 8, wherein the cam accommodating space is narrowed in the direction in which the cam structure is inserted by the inclined portion.

10. The UAV of claim 6, wherein the housing comprises an elastic member configured to press the landing member in a direction corresponding to an outer face of the housing.

11. The UAV of claim 10, wherein:
the hinge arm is rotatably coupled to the center portion by a hinge pin, and the elastic member comprises a coil-type torsion spring coiled around the hinge pin and configured to press against the landing member by being supported by the center portion.

12. The UAV of claim 2, wherein:
the at least one landing member comprises at least three landing members, and
the at least three landing members are arranged in a circumferential direction to be equiangular from a center portion of the housing.

13. An Unmanned Aerial Vehicle (UAV) comprising:
a housing;
a motor arranged in an inner space of the housing;
a rotor which is rotated by the motor and comprises at least one cam structure;
at least one rotor blade arranged in an inner space of the housing; and
at least one landing member,
wherein the at least one landing member is configured to form a part of the housing in a closed position and configured to protrude from the housing in an open position, and
wherein, when in the open position, the at least one landing member is configured to support a load of the UAV during landing,
wherein the at least one landing member comprises a cam interlocking portion,
wherein the cam structure comprises a first inclined portion and a first planar portion oriented in a direction for insertion into the cam interlocking portion wherein the cam interlocking portion receives the first inclined portion and then the first planar portion, according to the rotation of the rotor, and wherein the landing member transitions between the open position and the closed position, according to the receiving by the cam interlocking portion.

14. The UAV of claim 13, wherein:

the housing comprises a first housing having a convex disc shape and a second housing having a concave disc shape, the first housing and the second housing comprise a plurality of comb pattern unit members spaced apart by a specific interval in a circumferential direction from respective center portions, and the at least one landing member is configured to form a part of the plurality of comb pattern unit members.

* * * * *